(12) United States Patent
Huynh et al.

(10) Patent No.: US 12,112,587 B1
(45) Date of Patent: Oct. 8, 2024

(54) SYSTEM AND METHOD FOR GUIDED VEHICLE DIAGNOSTICS

(71) Applicant: Innova Electronics Corporation, Irvine, CA (US)

(72) Inventors: Thuan Huynh, Ho Chi Minh (VN); Keith Andreasen, Garden Grove, CA (US); Bruce Brunda, Irvine, CA (US); Danh Nguyen, Ho Chi Minh (VN); Phuong Pham, Fountain Valley, CA (US)

(73) Assignee: Innova Electronics Corporation, Irvine, CA (US)

( * ) Notice: Subject to any disclaimer, the term of this patent is extended or adjusted under 35 U.S.C. 154(b) by 0 days.

(21) Appl. No.: 18/328,289

(22) Filed: Jun. 2, 2023

(51) Int. Cl.
  *G07C 5/00* (2006.01)
  *G06F 40/40* (2020.01)
  *G07C 5/08* (2006.01)

(52) U.S. Cl.
  CPC ............ *G07C 5/008* (2013.01); *G06F 40/40* (2020.01); *G07C 5/0808* (2013.01); *G07C 5/0825* (2013.01); *G07C 2205/02* (2013.01)

(58) Field of Classification Search
  None
  See application file for complete search history.

(56) References Cited

U.S. PATENT DOCUMENTS

| | | | |
|---|---|---|---|
| 9,401,054 B2 | 7/2016 | Fountain et al. | |
| 9,881,428 B2 | 1/2018 | Barfield, Jr. et al. | |
| 10,891,809 B2 | 1/2021 | Liu et al. | |
| 2017/0084087 A1* | 3/2017 | Liu | G05B 23/0272 |
| 2022/0027963 A1* | 1/2022 | Isaac | G06Q 10/20 |
| 2022/0180056 A1 | 6/2022 | Hong | |
| 2022/0207931 A1* | 6/2022 | Hinduja | B60S 5/00 |
| 2023/0252824 A1* | 8/2023 | Merg | G07C 5/008 |
| | | | 701/29.4 |

OTHER PUBLICATIONS https://www.texausa.com/news/2023-05-02/texa-USA-releases-the-axone-voice.

* cited by examiner

*Primary Examiner* — James J Lee
*Assistant Examiner* — Wenyuan Yang
(74) *Attorney, Agent, or Firm* — Stetina Brunda Garred & Brucker

(57) ABSTRACT

A diagnostic process includes analyzing vehicle data received from a vehicle to identify diagnostic data, and to determine an identity of the vehicle. A most likely fix is determined based on a combined assessment of the diagnostic data and the vehicle identity. A determination of a special function test to run on the vehicle is made based on the determined most likely fix. A signal is generated to run the special function test, and a determination of a pass or fail status is made based on the special function test. If no special function test is associated with the most likely fix, more targeted testing can be implemented through the use of a test box configured to monitor communications along communication pathways on the vehicle, and also to selectively activate/deactivate components on the vehicle.

20 Claims, 20 Drawing Sheets

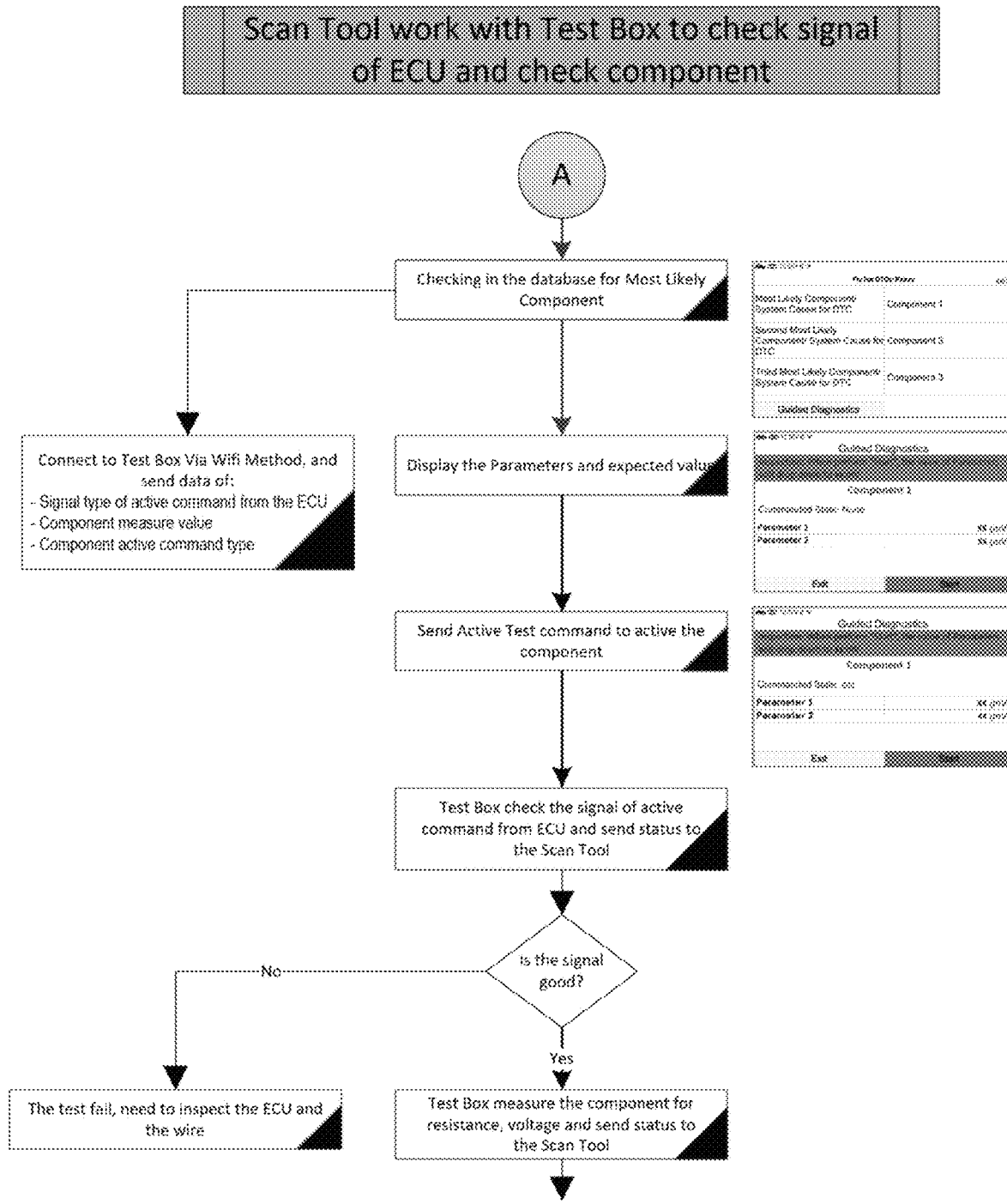
Figure 14C1

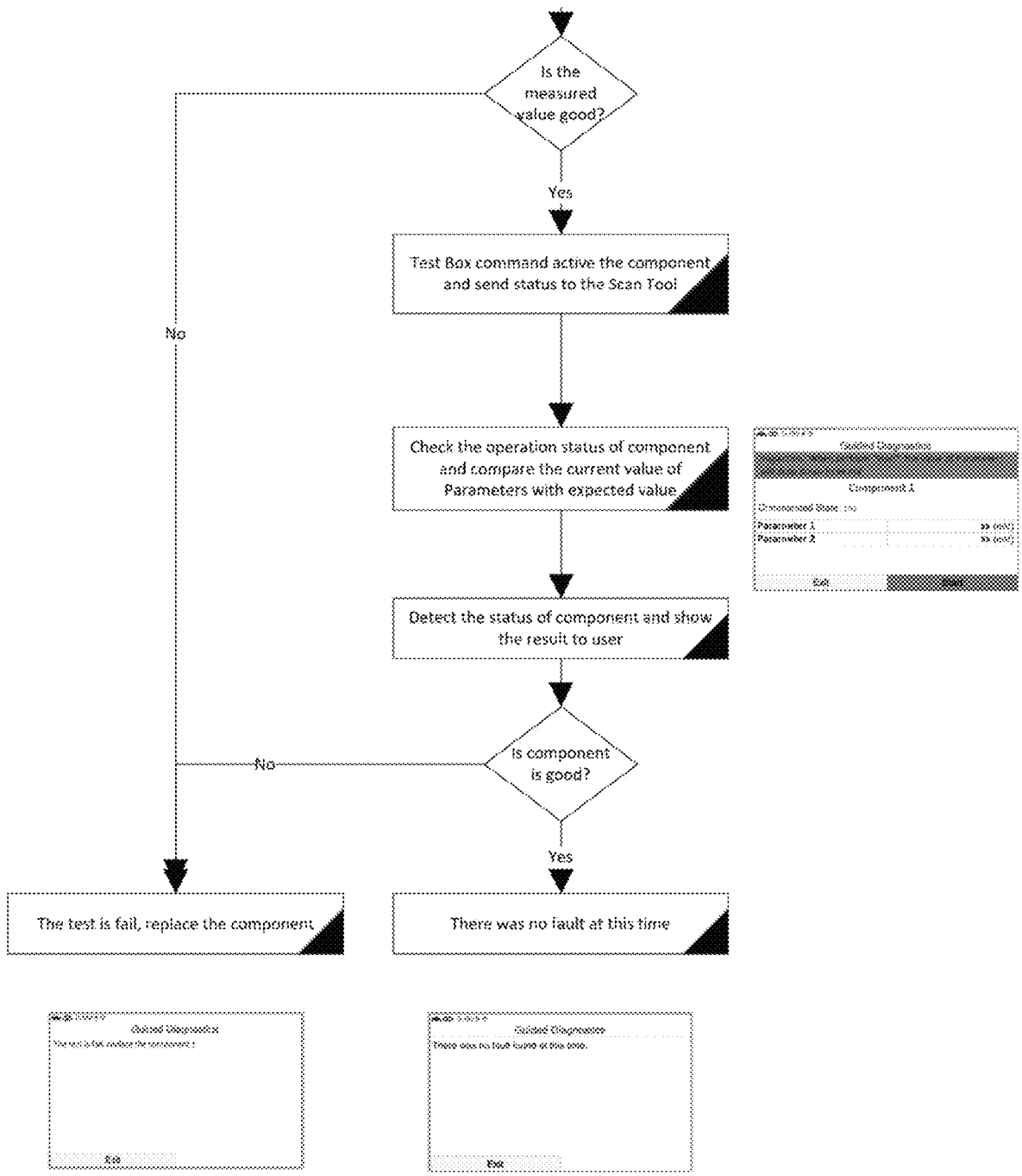
Figure 14C2

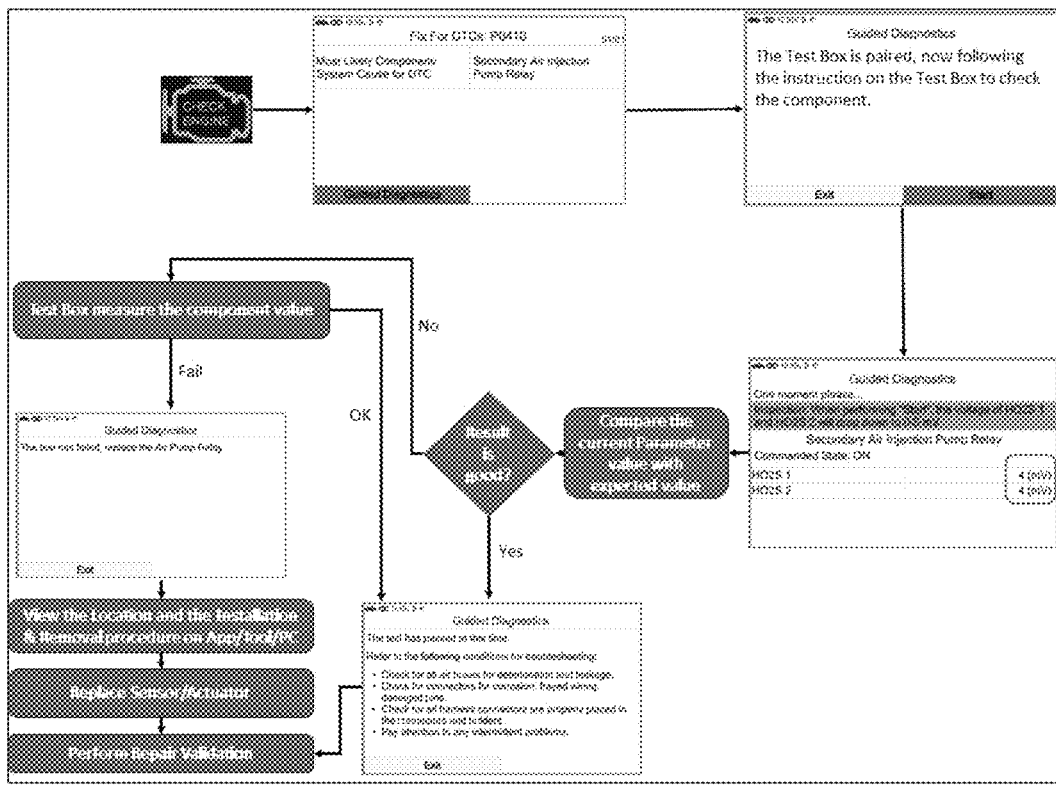

Figure 17

| Wiring Diagram | Pin Out | Activation Signal from ECU | Component Measure Spec | Activation Signal Type |
|---|---|---|---|---|
| | Pin 2 (Orange/Blue) – Battery Power<br><br>Pin 1 (Gray) – Control PIN (ECU) | Measure the Voltage at Pin 1 with Battery Power, specification is as below:<br>- When command ON: 12 V or more<br>- When command OFF: 0 V | 1. Measure Voltage between Pin 2 and Vehicle ground: It should be 12 or more<br>2. Measure Resistance between Pin 1 and Pin 2: It should be 9.4-10.4 ohms. | Connect Vehicle ground to PIN 1 --> Expect: The Valve is ON |

Figure 18

SYSTEM AND METHOD FOR GUIDED VEHICLE DIAGNOSTICS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to an automotive diagnostic system, and more specifically, to an automotive diagnostic system capable of running confirmatory diagnostic testing, irrespective of the vehicle being able to provide an electronic vehicle identification.

2. Description of the Related Art

The integration of computer systems into the automobile has resulted in automotive diagnostics including a data analysis component. In this regard, while historical vehicle diagnostics may have relied solely on a mechanic's assessment of what can be seen or heard during operation of the vehicle, the data provided by the contemporary vehicles allows for a much more comprehensive diagnostic assessment of the vehicle.

However, as vehicles evolve and more computers become integrated into the vehicle, using data to diagnose a vehicle may require a nuanced approach. For instance, diagnostic trouble codes (DTCs) are generated by contemporary vehicles when a problem has arisen in one or more components of the vehicle. Retrieving and reviewing the DTC(s) is certainly a useful part of a diagnostic process, particularly when the process is supported by historical data for vehicle specific resolution. However, relying solely on the DTC(s) may lead to ambiguous results, as the DTC(s) may be representative of a symptom based on an underlying, deeper diagnostic condition. Such ambiguities may lead to the vehicle owner to purchase a repair part that will not correct the underlying defect. Therefore, a more comprehensive analysis of the data may be needed to arrive at or confirm the true solution. Undertaking the task of analyzing the vehicle data may be beyond the capabilities or interest of the common vehicle owner, and thus, in many instances, problems with the vehicle may be ignored. Even professional mechanics may struggle at analyzing the vehicle data to troubleshooting problem. As such, an automated process that requires little or no user input is desirable.

These problems may be exacerbated when dealing with older vehicles that may provide a certain level of diagnostic data, but do not provide other useful information, such as an electronic vehicle identification number (VIN), which is provided in the diagnostic data package that is communicated from the vehicle diagnostic system of post-2006 vehicles. The VIN allows the diagnostic system to sort related historical data for the same, or similar vehicles, to obtain a higher resolution of the diagnostic condition of the vehicle under test. Thus, vehicles that do not provide that information may be even more challenging to diagnose. A diagnostic system that would be able to automatically derive the identification of the vehicle under test from the data provided by the vehicle, even where the vehicle is not operative to communicate a VIN within the received diagnostic data package would be advantageous.

Accordingly, there is a need in the art for a diagnostic system that provides an easy to use diagnostic tool and which undergoes diagnostic testing which is guided by the initial data retrieved from the vehicle. Various aspects of the present disclosure address this particular need, as will be discussed in more detail below.

BRIEF SUMMARY

In accordance with one embodiment of the present disclosure, there is provided a diagnostic process wherein a vehicle data is retrieved from the vehicle using a data acquisition and transfer device (DAT). The vehicle data is analyzed to identify a diagnostic trouble code (DTC) in the data, and also to determine whether the vehicle data includes an electronic vehicle identification number (VIN).

If the vehicle data does not include an electronic VIN, the vehicle data may be autonomously analyzed to recognize characteristics of the data that can be used to determine the identity of the vehicle. Once the vehicle is identified, the DTC(s) and the vehicle identity may be used to determine a vehicle condition. That condition may alternately/additionally be determined by autonomously enabling a special function test(s) of vehicle components/systems that are related to the received diagnostic data, e.g., the DTC(s) and any associated freeze frame data or other data included in the vehicle diagnostic package. The appropriate special function test(s) may be derived on a vehicle specific basis and may be informed on the basis of vehicle specific information stored on the DAT or accessed by the DAT from a remote diagnostic database. In one implementation, the DAT may be provided with a machine learning algorithm that allows the DAT to associate the vehicle data with a specific vehicle, vehicle operating characteristics and vehicle conditions autonomously, without resort to the use vehicle historic data stored on the DAT or on a remote database. Once the special function test is performed, live data is monitored and compared to expected live data values, as determined by the DAT. A pass/fail determination is made and a report may be generated for the user.

If the vehicle data does include the electronic VIN, then a determination is made as to a possibly faulty component based on a combined assessment of the electronic VIN and the DTC. A special function test associated with the faulty component is identified and run. The live data generated from the test is monitored and compared to expected live data values. A pass/fail determination is made and a report may be generated for the user.

The diagnostic process may utilize a test box when a vehicle electronic control unit (ECU) does not support active tests/special function tests to send targeted commands to specific vehicle components to either actuate or deactivate. The DAT may be configured to autonomously initiate testing by the test box in response to determination of the most likely fix, with the most likely fix not being associated with an active test/special function test. The test box may send a signal to the DAT with information regarding the targeted commands sent to the specific vehicle components to enable the DAT to monitor live data for the targeted component(s).

The DAT may be configured to initiate testing by the test box in response to certain conditions being monitored by the DAT. The conditions may be identified during prior testing/monitoring by the DAT. The conditions may be detected by monitoring live data associated with a previously conducted active test/special function test.

In another embodiment the DAT may autonomously access and transfer the vehicle data package, evaluate the vehicle data package, determine the availability of a relevant active test/special function test and/or initiate relevant live data monitoring to confirm a diagnostic solution/needed replacement part.

According to anther embodiment, there is provided a vehicle diagnostic system comprising a data processing device capable of receiving a data packet from a vehicle, with the data packet including diagnostic data; analyzing the vehicle data to determine if the vehicle data includes an electronic vehicle identification number (VIN); when the vehicle data does not include the electronic VIN, analyzing the vehicle data to determine an identity of the vehicle; determining a most likely fix and/or identifying a defective part based on a combined assessment of the diagnostic data and the electronic VIN or a combined assessment of the diagnostic data; determining a special function test to run on the vehicle based on the determined most likely fix; generating a signal to run the special function test; monitoring live data generated during the special function test; and determining a pass or fail status based on a comparison of the monitored live data to expected live data. The vehicle diagnostic system additionally includes a machine learning module in operative communication with the data processing device. The machine learning module is configured to enable training of the machine learning module based on sets of diagnostic data to generate a relevant fix, a relevant special function test, or a diagnostic solution; generate a machine learning output based on the data packet received from the vehicle, the machine learning output being the relevant fix, the relevant special function test or the diagnostic solution. The machine learning module additionally includes a machine learning controller configured to implement the capabilities of the machine learning module based on an assessment of the data packet.

The data processing device may be a DAT. The machine learning module may be located in the DAT, or outside of the DAT.

The machine learning controller may be further configured to implement the capabilities of the machine learning module based on an assessment of the capabilities of the resources external to the data processing device.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 17 depicts sequential screenshots on a DAT during the second use-case example;

FIG. 18 is a chart depicting details of an intake oil control valve that the DAT sends to the test box during a third use-case example.

Common reference numerals are used throughout the drawings and the detailed description to indicate the same elements.

DETAILED DESCRIPTION

The detailed description set forth below in connection with the appended drawings is intended as a description of certain embodiments of a vehicle diagnostic system and related method, and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Various aspects of the present disclosure relate to a vehicle diagnostic system which leverages knowledge of a vehicle's systems and how those systems interact during normal operation of the vehicle to influence decisions made during a diagnostic process.

A conventional diagnostic process may entail retrieving a DTC, and accompanying static data from a vehicle and trying to determine a possible diagnostic solution based solely on that data. However, in some instances, the component that may be directly associated with the DTC may be experiencing symptoms related to an underlying diagnostic condition. In this regard, the component associated with the DTC may actually be healthy, and the DTC may have triggered due to some issues with an operationally related component. Thus, various aspects of the present disclosure relate to a more granular diagnostic assessment, wherein a first-order DTC analysis, which may also include one or more accompanying sets of freeze frame data, is conducted to identify the associated component, and then a second-order analysis is conducted wherein the identified component is tested to generate live data, which is compared to expected data for the specific vehicle under test to determine whether the associated component is healthy (e.g., pass) or unhealthy (e.g., fail).

Figure 1:
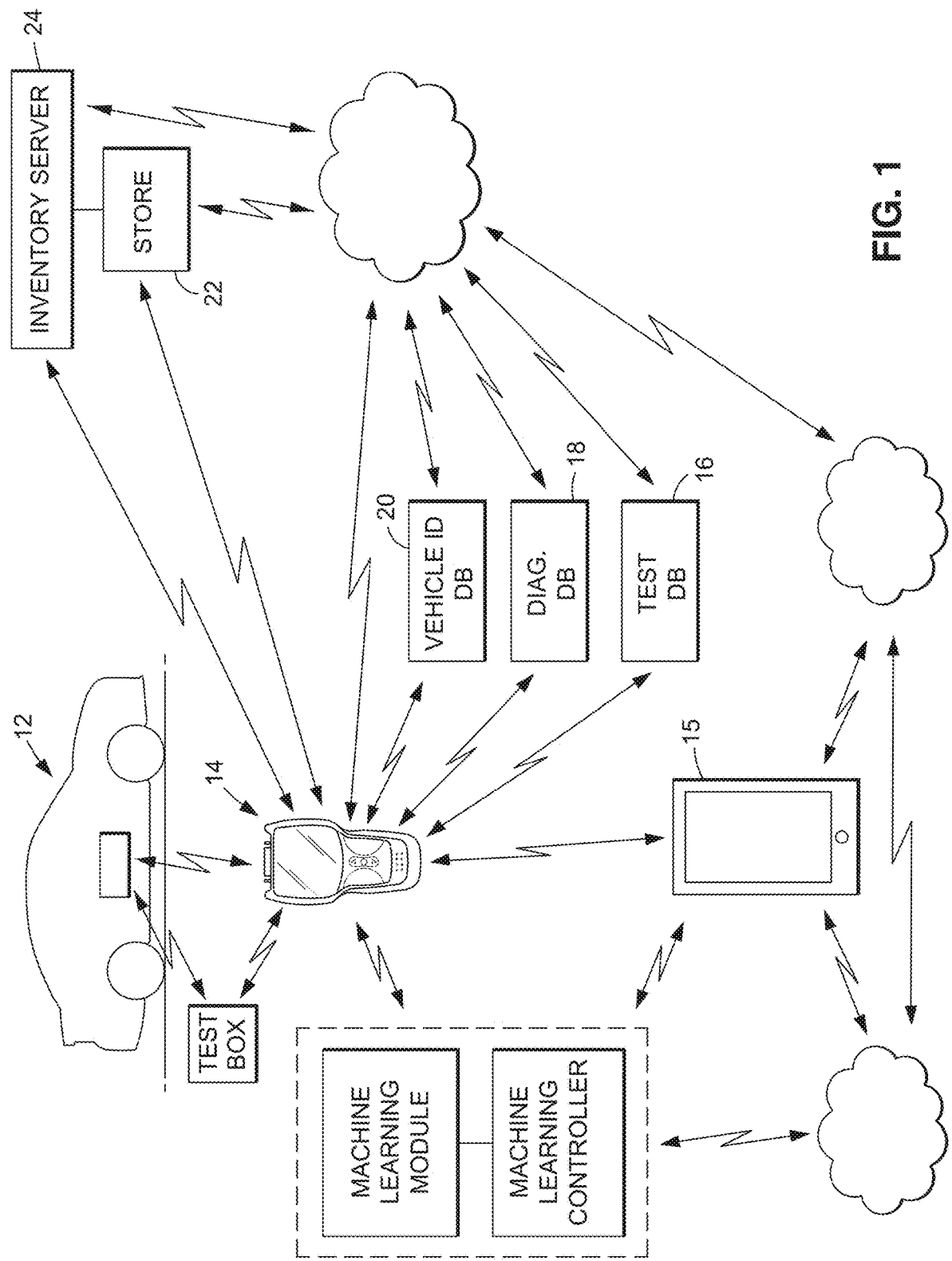
FIG. 1 is a schematic overview of a diagnostic system according to an embodiment of the present disclosure.

Referring now to FIG. 1, there is depicted a schematic view of one embodiment of a diagnostic system 10 for use in diagnosing a vehicle 12. The system 10 may utilize a DAT 14, a test database 16, a DTC database 18, and a vehicle identification database 20. The DAT 14 may broadly refer to a scan tool, a code reader, a diagnostic dongle, a tablet computer, a smartphone having diagnostic software loaded thereon, or other hardware known by those skilled in the art capable of communicating with the vehicle. The system 10 may also allow for use with a personal electronic device 15, such as a smartphone, tablet computer, or the like. As will be explained in more detail below, the diagnostic system 10 may be implemented in a parts store or shop environment, and thus, FIG. 1 additionally depicts a store 22 and an inventory server 24 in communication with the store 22.

Figure 2:
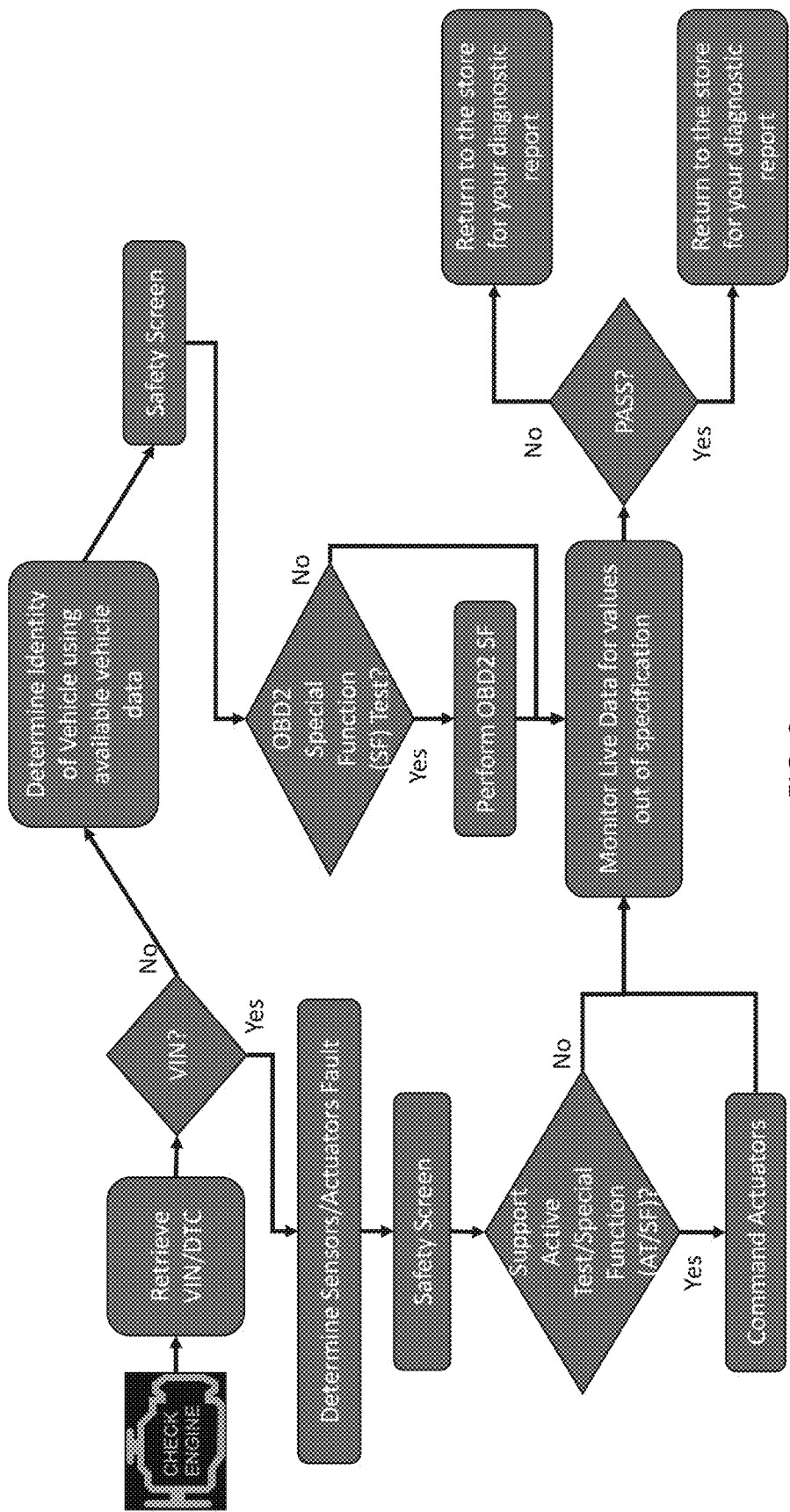
FIG. 2 is a flow chart illustrating a diagnostic methodology according to one embodiment of the present disclosure configured for limited user interaction.
Figure 3:
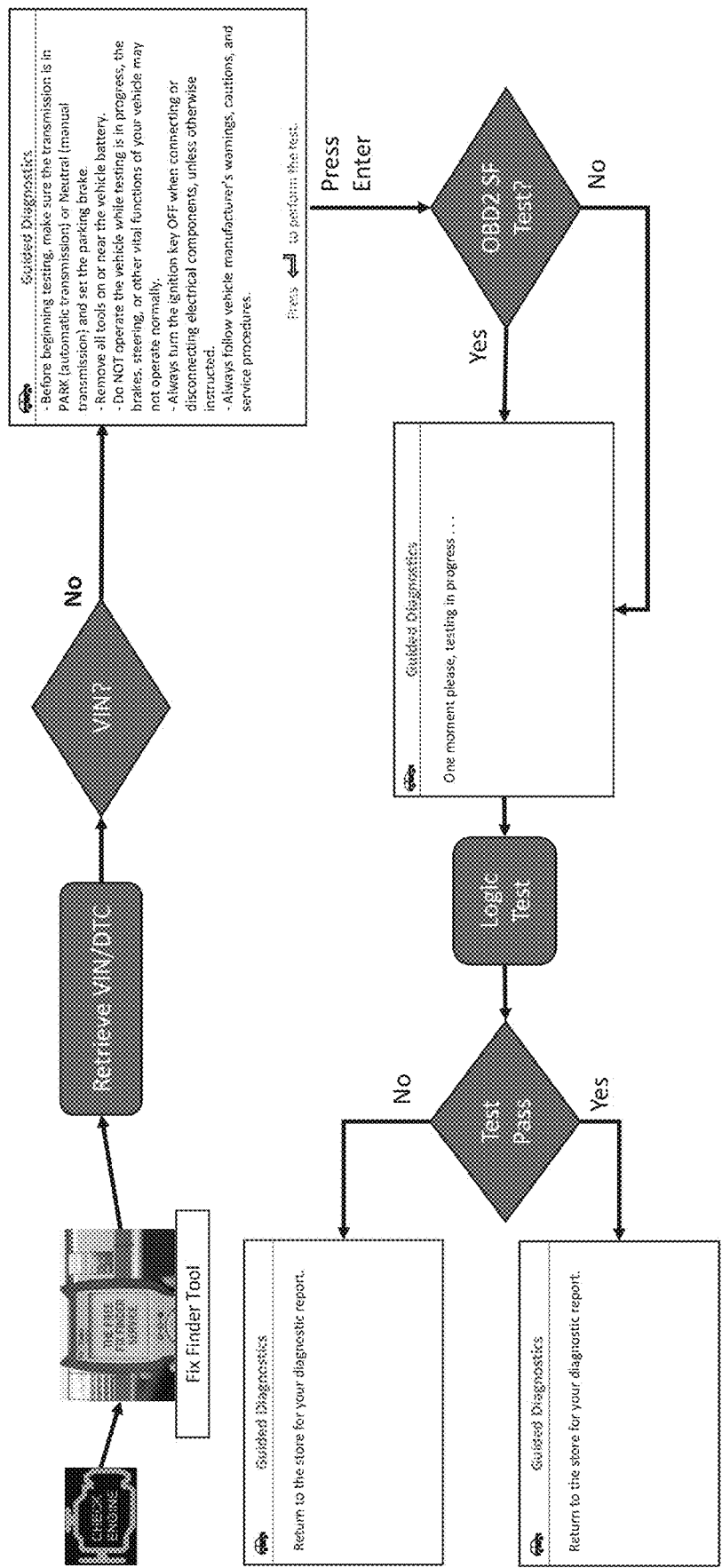
FIG. 3 is a flow chart illustrating user interface displays at various steps of a no-VIN portion of the diagnostic methodology depicted in FIG. 2.
Figure 4:
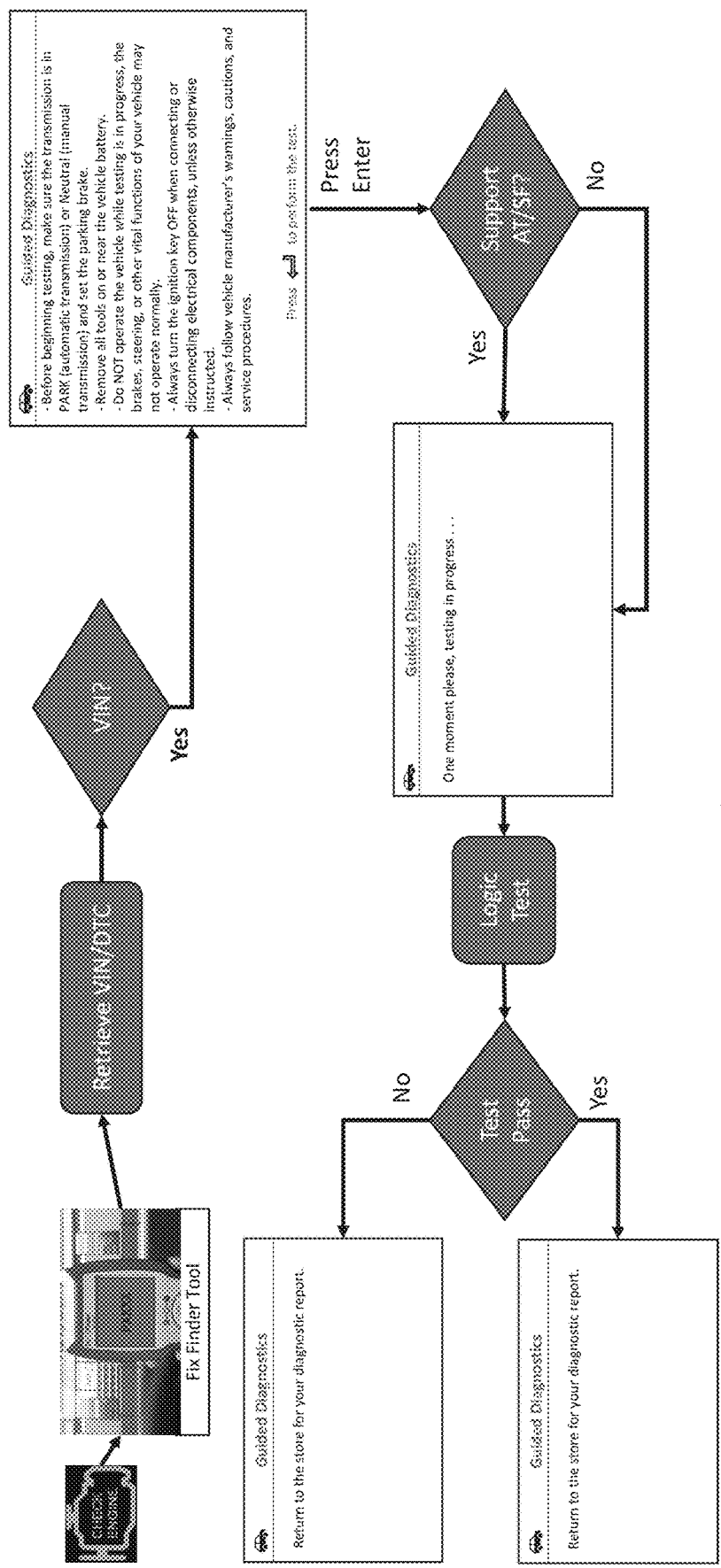
FIG. 4 is a flow chart illustrating user interface displays at various steps of a yes-VIN portion of the diagnostic methodology depicted in FIG. 2.
Figure 5:
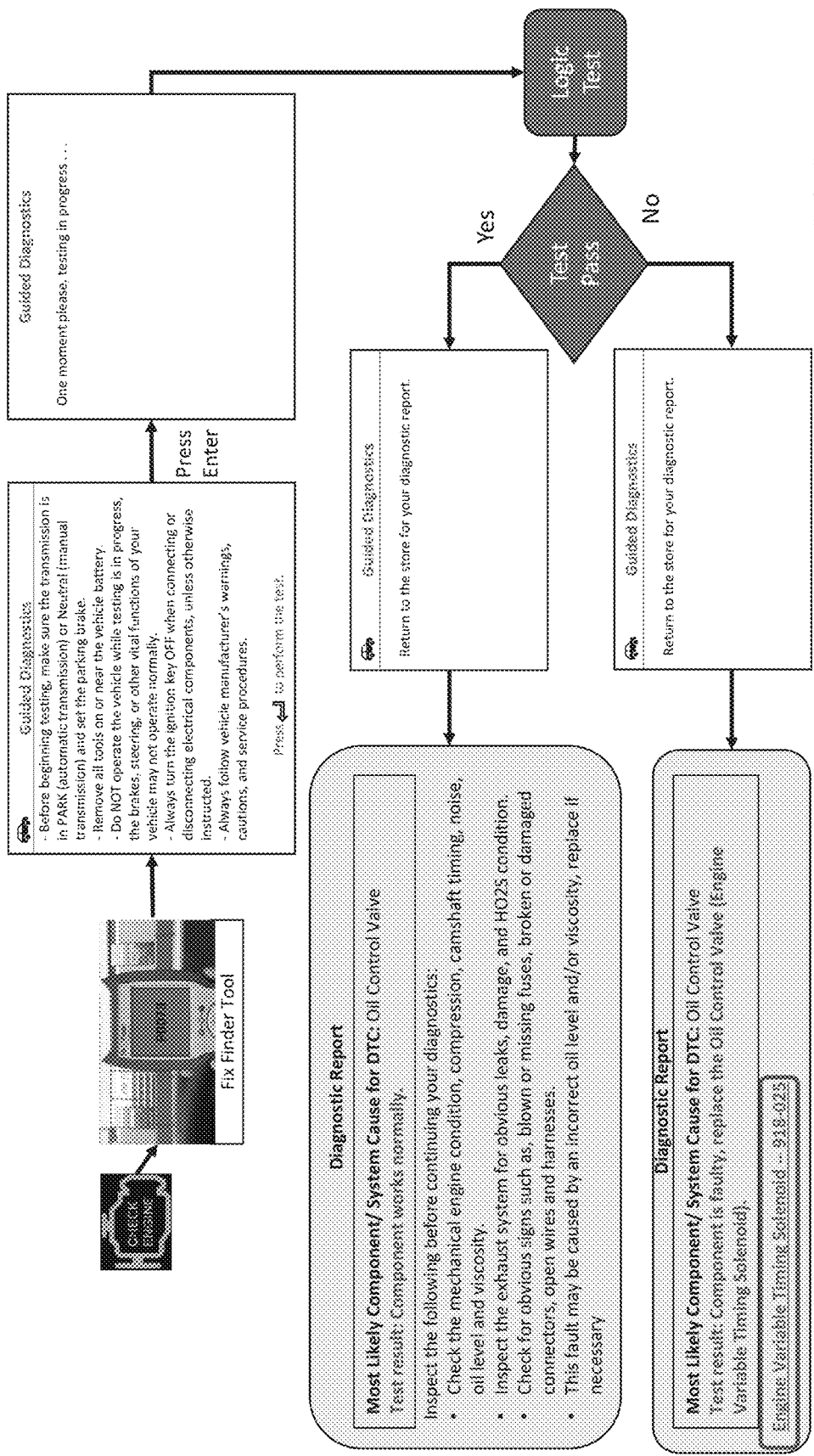
FIGS. 5 and 6 are flow charts illustrating an exemplary use of the diagnostic methodology disclosed herein.
Figure 6:
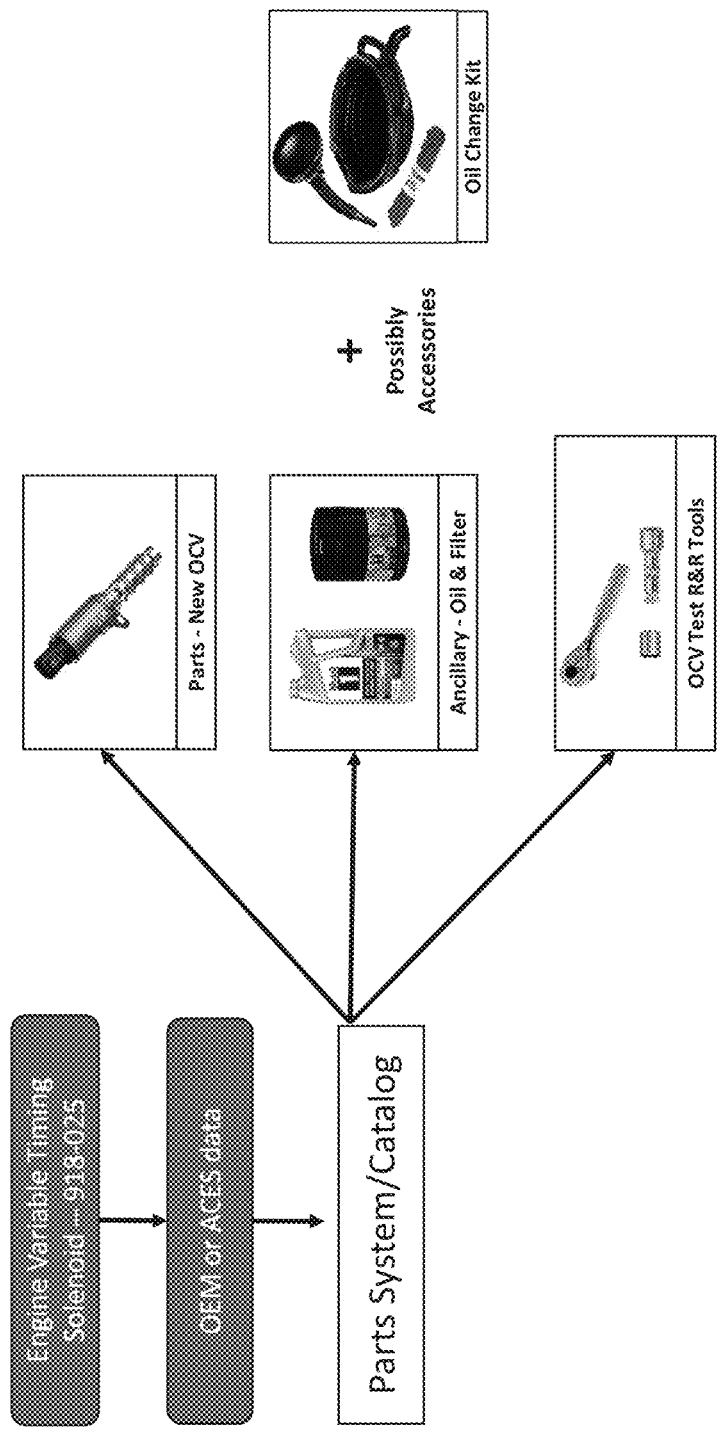

Referring now to FIG. 2, there is depicted a flow chart representative of one embodiment of an automotive diagnostic process. As can be seen, the process may be initiated by retrieving diagnostic data from the vehicle 12. The diagnostic data may be received as a data packet sent by an onboard vehicle computer in response to a request made by the DAT 14. Diagnostic data may refer to DTCs, freeze frame data, live data, etc. It is understood that the data packet may include different types of information, depending on the vehicle 12. For older vehicles, e.g., those prior to 2004/2005, the data packet may only include diagnostic information, such as DTCs, stored on an onboard vehicle computer. For newer vehicles, the data packet may include diagnostic information as well as an electronic VIN, or other vehicle identifying information.

The diagnostic process proceeds down one path (e.g., the "No" path) if the data packet does not include the VIN, and another path (e.g., the "Yes" path) if the data packet does include the VIN. In this regard, various aspects of the diagnostic process discussed herein are not reliant on being able to retrieve the VIN from the vehicle. Both pathways will be discussed in more detail below, and ultimately converge in the diagnostic process.

No VIN Path

The diagnostic process proceeds down the no-VIN path when one or more DTCs are retrieved from the vehicle 12, and an electronic VIN is not retrieved from the vehicle 12. Ultimately, the diagnostic process will entail performing an onboard diagnostics-II (OBD2) special function test to obtain live data for use in making a diagnostic decision. A special function test may refer to a control test that a vehicle module will run. Where the vehicle is equipped with an OEM diagnostic functionality that is available to licensed aftermarket DATs 14, the DAT 14 can activate that functionality to generate diagnostic information that can confirm a diagnostic condition or lead to a further evaluation of the diagnostic condition. Where no such OEM diagnostic functionality is available to the aftermarket DAT 14, other means can be implemented to derive the appropriate control test from the vehicle data. In the situation, it is noted that a control test data base may be stored in an aftermarket DAT 14 or may be accessed from a remote database via the DAT 14. However, a selection of which special function test to perform may be predicated upon the operating environment of a specific vehicle under test. As such, the control test may need to be based on an assumption or estimation of the identification of the vehicle 12 (e.g., the year, make, model, engine, etc.). Therefore, prior to running the special function test, the diagnostic process includes analyzing available data from the vehicle 12 to make a determination as to the identification of the vehicle 12.

For later model vehicles, identification of the vehicle 12 may be included in the OBD2 data packet received from the vehicle 12. In other cases, the pertinent vehicle identification information may be derived from the data received from the vehicle, which may include unique characteristics useful in the identification assessment. In this regard, certain features of the data packet may be similar to a fingerprint, which can be analyzed to identify the vehicle, or certain characteristics of the vehicle. The vehicle identification database 20 may be accessed during the process of identifying the vehicle 12. In this regard, the vehicle identification database 20, which may be loaded onto the DAT 14 or accessible by the DAT 14, may include vehicle identifying information matched with vehicle data, such that the vehicle data retrieved form the vehicle 12 may be matched with vehicle identifying information to determine the identity of the vehicle 12. For example, while certain DTC(s) are considered to be generic, other DTC(s) may be unique to specific manufacturers or certain engines provided by those manufacturers. An identification and evaluation of such data can lead to an identification of the vehicle under test in sufficient detail to enable a higher resolution of the diagnostic condition of the vehicle under test. As set forth below, that identification, resolution and evaluation may proceed autonomously, or may be guided by select user input.

According to one embodiment, the vehicle identification can be determined based on the vehicle protocol, the calibration verification number and/or the calibration ID. As to vehicle protocol, it is understood that a first group of vehicle types may use a first communication protocol, while a second group of vehicle types may use a second communication protocol. Thus, by identifying the communication protocol for the vehicle under test, the system 10 may be able to identify the group to which the vehicle under test belongs, and eliminate the other group(s) to which the vehicle does not belong. For instance, GENERAL MOTORS vehicles and CHRYSLER vehicles have been known to communicate in the VPW communication protocol, while FORD vehicles and MAZDA vehicles have been known to use the PWM communication protocol.

The calibration verification number (CVN) may also be used to help determine the vehicle's identity. The CVN may refer to a number or other identifier (e.g., alphanumeric code) that may be generated by an onboard vehicle computer and used to verify onboard computer software integrity in diagnostic or emission critical powertrain control units. The system 10 may include a database of historical CVNs gathered from a multitude of previous vehicles, with the historical CVNs in the database being matched to vehicle identification information. For instance, a first CVN may be matched with first vehicle identification information (e.g., year, make, model, engine), and a second CVN may be matched with second vehicle identification information. Thus, the CVN from the vehicle under test may be cross-referenced with the historical CVNs, and the vehicle identification information associated with the historical CVN(s) that most closely correspond to the CVN from the vehicle under test may be identified as the likely vehicle identification information of the vehicle under test.

It is further understood that certain levels of vehicle identification information may be determinable from information capable of being retrieved from the vehicle. For instance, a first diagnostic level may refer to a diagnostic process based on the year, make, model, and engine of the vehicle, in combination with a DTC(s). A second diagnostic level may refer to a diagnostic process based on the make, model of the vehicle, in combination with a DTC(s). A third diagnostic level may refer to a diagnostic process based on the make of the vehicle, in combination with a DTC(s). A fourth diagnostic level may refer to a diagnostic process based solely on the DTC. Other diagnostic levels may also be possible based on other available combinations of the year, make, model, engine, and DTC(s) without departing from the spirit and scope of the present disclosure.

The accuracy of the diagnostic result, e.g., an identification of a needed part replacement, may increase as the amount of vehicle identification used in the diagnostic process also increases. For instance, the accuracy of the first diagnostic level (e.g., YMME and DTC) may be higher than the accuracy of the second diagnostic level (e.g., MM and DTC). Thus, if the diagnostic process is based on partial vehicle identification information (e.g., information that does not include YMME), then follow up testing or diagnostics may be performed after identifying a first likely solution, either to confirm the accuracy of the first likely solution, or to identify a second likely solution in the event the first likely solution is determined to be inaccurate.

Once the identification of the vehicle 12 is determined, the vehicle identity in combination with the retrieved DTCs may be used to determine which special function test to perform. According to one embodiment, the special function test may be determined by identifying a most likely fix associated with the combined vehicle identify and DTC, and then identifying a special function test associated with the most likely solution. For more information related to using diagnostic data, such as DTCs to determine a most likely fix, please refer to U.S. Pat. No. 11,068,560 entitled METHOD OF PROCESSING VEHICLE DIAGNOSTIC DATA, assigned to Innova Electronics Corporation, the contents of which are expressly incorporated herein by reference. The test database 16 may include stored combinations of most likely fixes matched with special function tests/active tests, or other tests/procedures that may generate live data or other monitorable data/information detectable by the DAT 14. The test database 16 may be vehicle specific, such that the special function test for a particular component (e.g., an oil control valve) may be different for different vehicles. Thus, knowing the identify of the vehicle 12 allows for determination of which vehicle-specific portion of the database from a plurality of vehicle-specific database portions to access, and then having the DTCs allows for a determination of the special function test that is matched with that DTC or combination of DTCs.

In another embodiment, the test database 16 may be arranged to avoid the need for having to identify a most likely fix to determine a special function test. In this regard, the test database 16 may include DTCs matched directly with special function tests. Therefore, if resources needed to identify a most likely fix are unavailable, the system 10 may be able to identify a special function test more directly based on the DTC(s).

The special function test may be useful for testing many common vehicle components including, but are not limited to, the secondary air injection pump, the oil control valve, the electronic throttle valve, the exhaust gas recirculation valve, the evaporative emissions canister vent valve, the evaporative emissions purge solenoid, the fuel injector, the fuel pump, and the ignition coil.

Once an identification of the vehicle 12 is made and the special function test is identified, the diagnostic process may proceed, wherein a safety screen may be displayed to a user to provide instructions and alerts to the user prior to initiating the special function test. For instance, the safety screen may specify that before testing begins, to ensure the transmission is in park (for an automatic transmission) or neutral (for a manual transmission), and that the parking brake is set. The safety screen may also remind the user to remove all tools on or near the vehicle battery, and to not operate the vehicle while testing is in progress, as the brakes, steering or other vital functions of the vehicle may not operate normally during testing. The safety screen may also instruct the user to always turn the ignition key to OFF when connecting or disconnecting electrical components, unless otherwise instructed. An instruction to follow the vehicle manufacturer's warnings, cautions, and service procedures may also be displayed to the user.

The safety screen may be displayed on a display integral to the DAT 14, or on a screen in operative communication with the DAT 14, such as a nearby computer, smartphone 15, tablet, etc.

After the safety screen has been displayed, the DAT 14 may send a signal to the vehicle 12 to run the special function test. Live data may be generated by the vehicle in response to running the special function test, and the DAT 14 may be in communication with the vehicle 12 so as to monitor the live data. Each special function test may be associated with acceptable test results and unacceptable test results. For instance, if a given test is run, live data within a known range may be expected for a healthy component, while live data outside that known range may reveal the component as being unhealthy.

It is understood that in some instances, the component associated with the identified most likely fix may not be supported by, or associated with, a special function test. In that regard, the system 10 may simply monitor live data associated with one or more components related to the most likely fix. The flow chart depicted in FIG. 2 represents this scenario by the "No" branch extending from the OBD2 Special Function (SF) Test?" decision block.

The live data is compared to acceptable values (e.g., expected values) to determine whether the component that is the subject of the special function test passes or fails. As noted above, if the live data matches with the acceptable values for that particular test, then the component passes, and if the live data does not match with the acceptable values for that particular test, then the component fails.

It is contemplated that the diagnostic process discussed herein may be implemented in a parts/services store 22 to allow customers to determine what fixes may be needed on their vehicle 12. The store 22 may loan the DAT 14 to the customer to allow the customer to take the DAT 14 to their vehicle 12 to facilitate the diagnostic process. In this regard, many of the functionalities discussed herein may be implemented autonomously, without requiring user input or intervention. In one particular embodiment, the customer may be required to plug the DAT 14 into the diagnostic port of the vehicle 12, and then the DAT 14 may be capable of retrieving the DTC, determining that no VIN is provided by the vehicle 12, determining an identity of the vehicle 12 through an analysis of available vehicle data, determining the special function test based on a combined assessment of the retrieved DTC and the determined identity of the vehicle 12, displaying the safety screen, sending instructions to the vehicle 12 to run the special function test, comparing the live data from the special function test to acceptable results and determining if the rest results in a pass or fail, all of the foregoing functionalities being performed autonomously in response to a triggering event. The triggering event may be the DAT 14 being plugged into the diagnostic port on the vehicle 12, or the user actuating a button on the DAT 14 or on a device in communication with the DAT 14 (e.g., a smartphone 15, kiosk, etc.). The results of the test may be displayed on the same display which displayed the safety screen. The user may then return the DAT 14 to the store 22 and receive a diagnostic report based on the results of the testing, regardless of whether the test results in a pass or fail. The diagnostic report may be printed in the store for the customer and/or sent to the user electronically, such as to the user's email address or via sms message.

It is also contemplated that the pass/fail data may be used to determine what replacement parts are needed to repair a failed test. In this respect, the pass/fail data may be used to determine a part number or aftermarket catalog exchange standard (ACES) ID, which may be used to simplify the purchase of the parts in the store. For instance, there may be communication between the systems which facilitate the diagnostic process and the parts store inventory systems to facilitate seamless purchasing of the correct parts (e.g., parts that are suitable replacement parts) at the store. The repair part and the corresponding part number may be may included in the diagnostic report, along with the most likely solution and the vehicle data received from the vehicle. For more information regarding the use of the ACES ID, please refer to U.S. Pat. No. 9,824,507 entitled MOBILE DEVICE BASED VEHICLE DIAGNOSTIC SYSTEM, also assigned to Innova Electronics Corporation, the contents of which are expressly incorporated herein by reference.

Yes VIN Path

When the electronic VIN is provided by the vehicle 12, the retrieved DTC in combination with the electronic VIN may be used to determine a likely faulty component (e.g., sensor or actuator) using conventional diagnostic processes, wherein DTC and vehicle identification information (e.g., the electronic VIN) are reference in the DTC database 18 to see which component is matched with the DTC. The vehicle identity in combination with the retrieved DTCs may be used to determine which special function test to perform. According to one embodiment, the test database 16 may be accessed to identify the special function test.

The safety screen may be displayed to the user to provide instructions and alerts to the user prior to initiating the special function test. After the safety screen has been displayed, the DAT 14 may send a signal to the vehicle 12 to run the special function test or active. The running of the special function/active test generates live data, which is monitored by the DAT 14. Each special function/active test may be associated with acceptable test results and unacceptable test results. Acceptable results may be a set of values, or a range of values, for certain component operating signals. For instance, if a given test is run, live data within a known range may be expected for a health component, while live data outside that known range may reveal the component as being unhealthy.

The live data is compared to acceptable values to determine whether the component that is the subject of the special function test passes or fails. As noted above, if the live data matches with the acceptable values for that particular test, then the component passes, and if the live data does not match with the acceptable values for that particular test, then the component fails.

It is contemplated that various resources used throughout the foregoing process may be located at various locations. For instance, the test database 16, DTC database 18 and vehicle ID database 20 may be located remote from the DAT 14 and accessed as needed during the process via remote communication capabilities (e.g., accessed through the cloud via Internet connection). Alternatively, the test database 16, DTC database 18 and vehicle ID database 20, or relevant portions thereof, may be loaded locally on the DAT 14, or on another local device, such as a user's smartphone 15, which may be a relay with the DAT 14 to facilitate implementation of the functionalities described herein.

Non-Professional System/Professional System

It is contemplated that the overall system 10 and the DAT 14 used in the system 10 may have differing levels of functionalities. Along these lines, FIGS. 2-6 described above may relate to a diagnostic system 10 intended to limit user interaction. This may be suitable, as mentioned above, for a retail store environment, where customers who have limited knowledge of vehicle diagnostics may visit and use the system 10. U.S. Pat. No. 11,335,139 entitled SYSTEM AND METHOD FOR SELECTIVE VEHICLE DATA RETRIEVL, owned by Innova Electronics Corporation, and expressly incorporated herein by reference, provides additional discussion regarding diagnostic systems and methods which provide useful diagnostic information while casing operation for a user. However, other embodiments, may be configured for enhanced user interaction, as depicted in FIGS. 7-11. Such enhanced user interaction may be appropriate for professionals or automotive enthusiasts with an advanced knowledge of automotive diagnostics.

Figure 7:
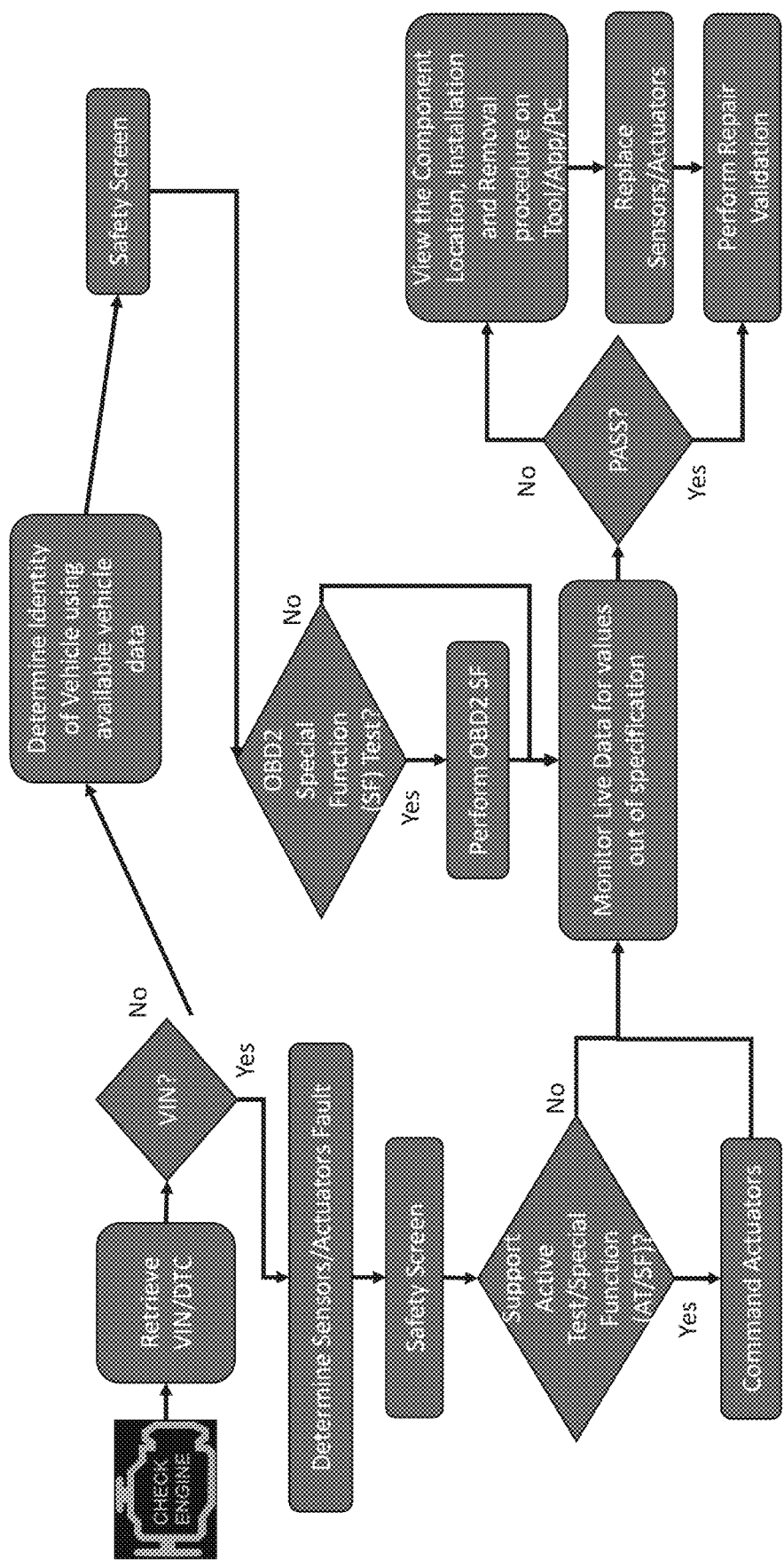
FIG. 7 is a flow chart illustrating a diagnostic methodology according to one embodiment of the present disclosure configured for enhanced user interaction.

FIG. 7 is a flowchart of the process overview of the system with enhanced user interaction. As can be seen, FIG. 7 is very similar to FIG. 2, with a primary distinction being the steps that occur subsequent to the pass/fail determination. If the live data comparison shows a failed component, the system allows for viewing of the component location, installation and removal procedures on the DAT 14 or an associated device. The component is then replaced, and then a validation is conducted. On the other hand, if the live data reveals a pass or acceptable component, then the system 10 may instruct the user to perform a repair validation, which may include operating the vehicle 12 within the conditions recorded in relevant freeze frame data as may be available from the vehicle. The relevant freeze frame data may be a snapshot of data captured at the time of the vehicle generated the DTC(s) from which the most likely fix was based. The repair validation may also more broadly refer to any validating drive cycle or other procedure that may validate a prior conclusion. In this regard the repair validation may refer to any validation procedure performed after a fix has been facilitate, or even after a component has passed a special function test, and subsequent validation is conducted to confirm the passed status.

Figure 8:
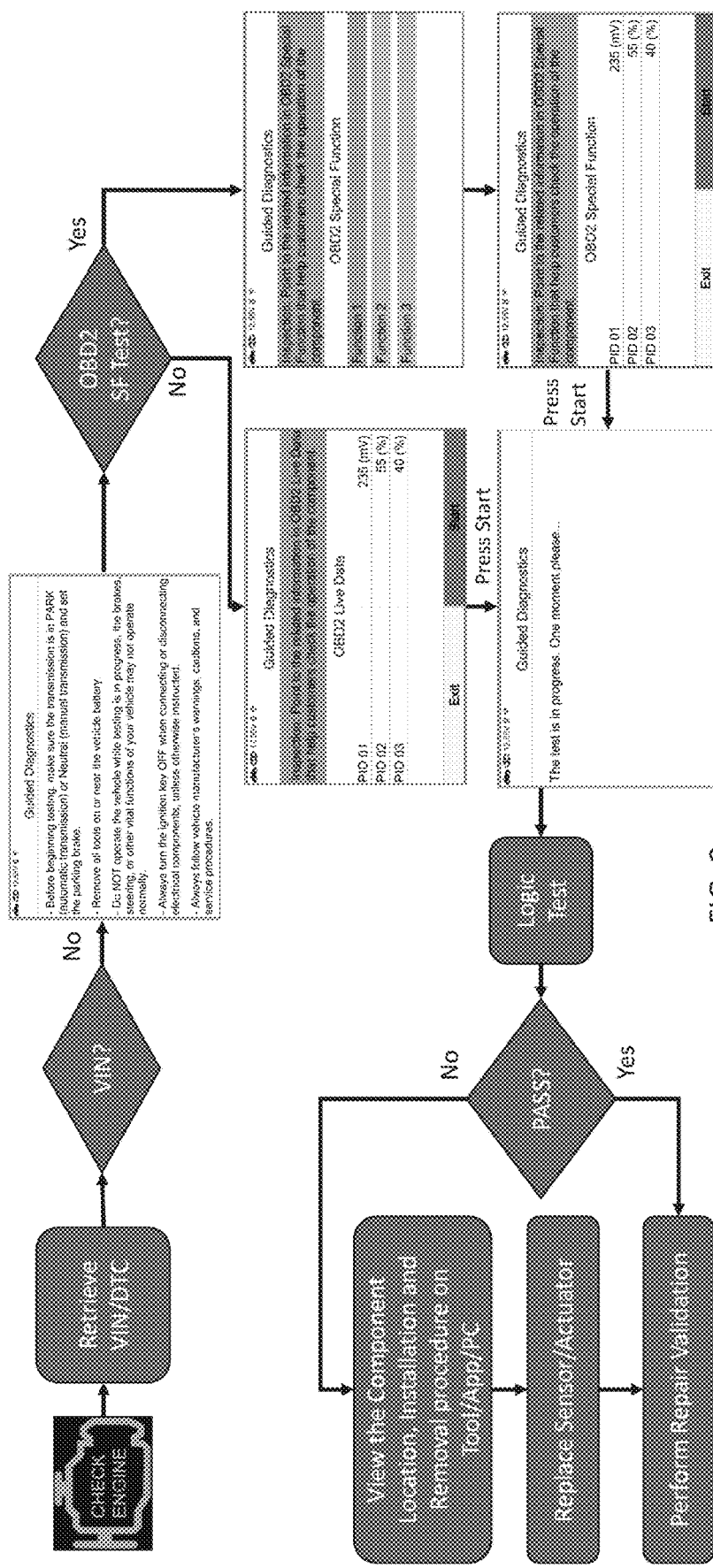
FIG. 8 is a flow chart illustrating user interface displays at various steps of a no-VIN portion of the diagnostic methodology depicted in FIG. 7.

FIG. 8 shows a flow of the user interface when no VIN is received from the vehicle. As can be seen, the display screen is listed prior to a possible special function test. When a special function test is to be conducted (e.g., following the "yes" branch), the enhanced capabilities associated with the user interface flow of FIG. 8, may allow for user selection of the special function test when more than one special function tests is available. Multiple special function tests may be available when multiple most likely fixes may be suggested based on the diagnostic data retrieved from the vehicle. In the example shown in FIG. 8, three most likely fixes are identified, each being associated with a special function test (e.g., Function 1, Function 2 and Function 3).

The user may then select which special function test to run by selecting the associated function on the user interface. The ability to provide user selection of the special function test differs from the process described above in relation to FIGS. 2-4, wherein user interaction is limited/simplified. In that instance, if there are multiple most likely fixes, the system 10 may be able to select one of the most likely fixes based on one or more rules, such as which most likely fix is associated with a higher success rate based on historical information.

FIG. 8 also shows the live data associated with the special function test. The live data includes data associated with PID 01, PID 02, and PID 03.

FIG. 8 further shows an exemplary user interface when no special function test is performed. As described in more detail above, the identified most likely fix may be associated with a component that is not related to a particular special function test. In that instance, the live data associated with the component related to the most likely fix may be displayed and monitored.

Figure 9:
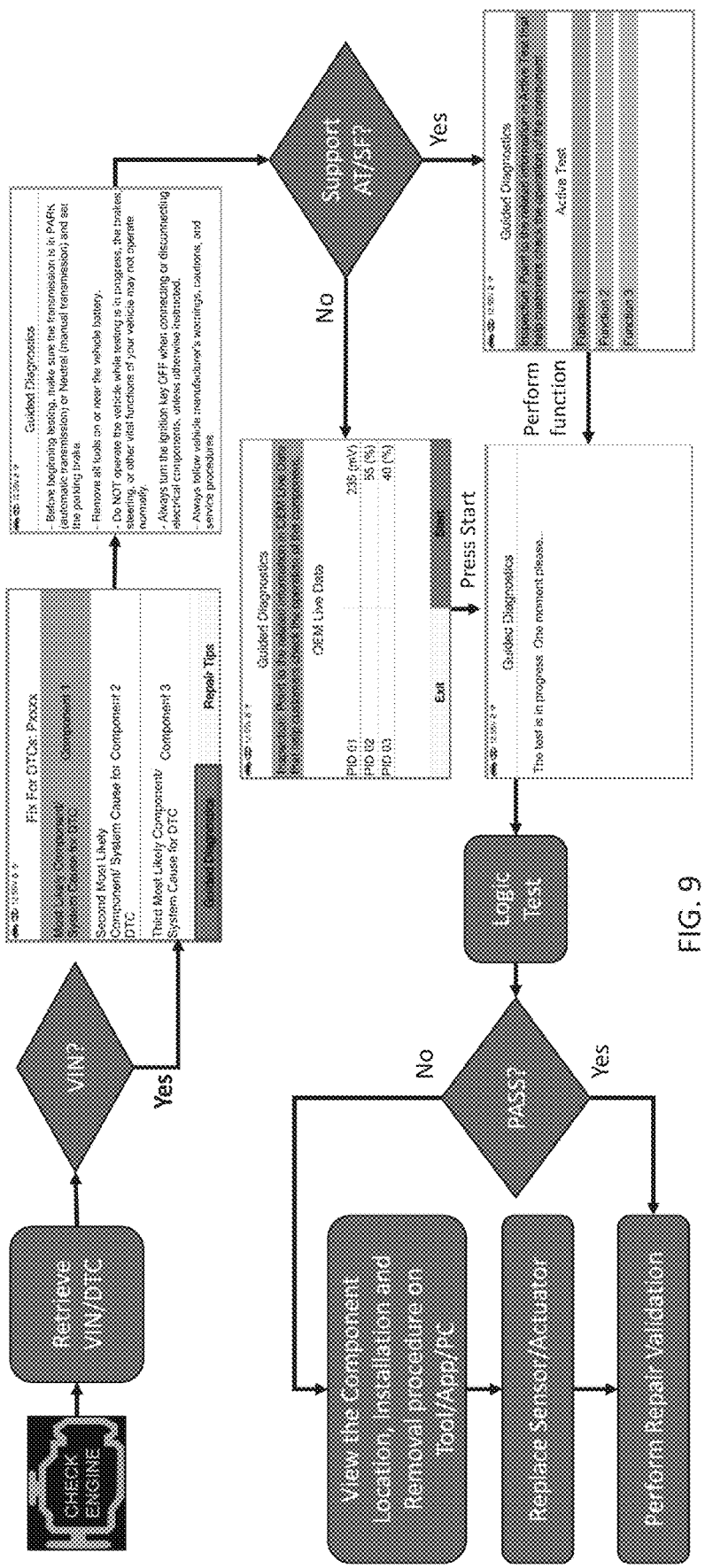
FIG. 9 is a flow chart illustrating user interface displays at various steps of a yes-VIN portion of the diagnostic methodology depicted in FIG. 7.

FIG. 9 shows a flow of the user interface when a VIN is received. In the example shown in FIG. 9, various most likely fixes are illustrated on a display, e.g., most likely component, second most likely component, third most likely component. The user may be given the option of which most likely component to proceed with (e.g., which most likely component to use in determining the special function test).

Figure 10:
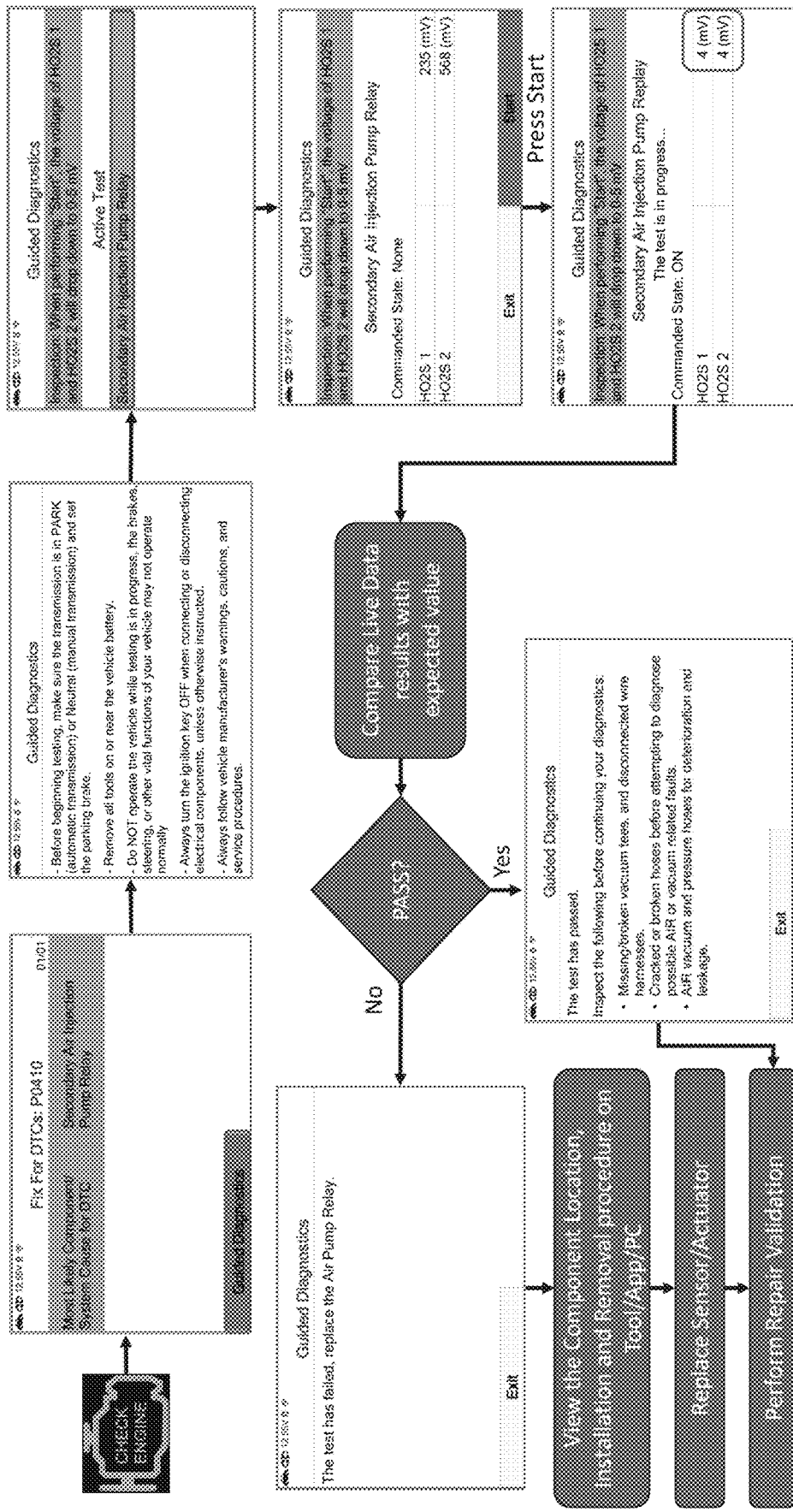
FIGS. 10 and 11A-B are flow charts illustrating exemplary uses of the diagnostic methodology disclosed herein.
Figure 11A:
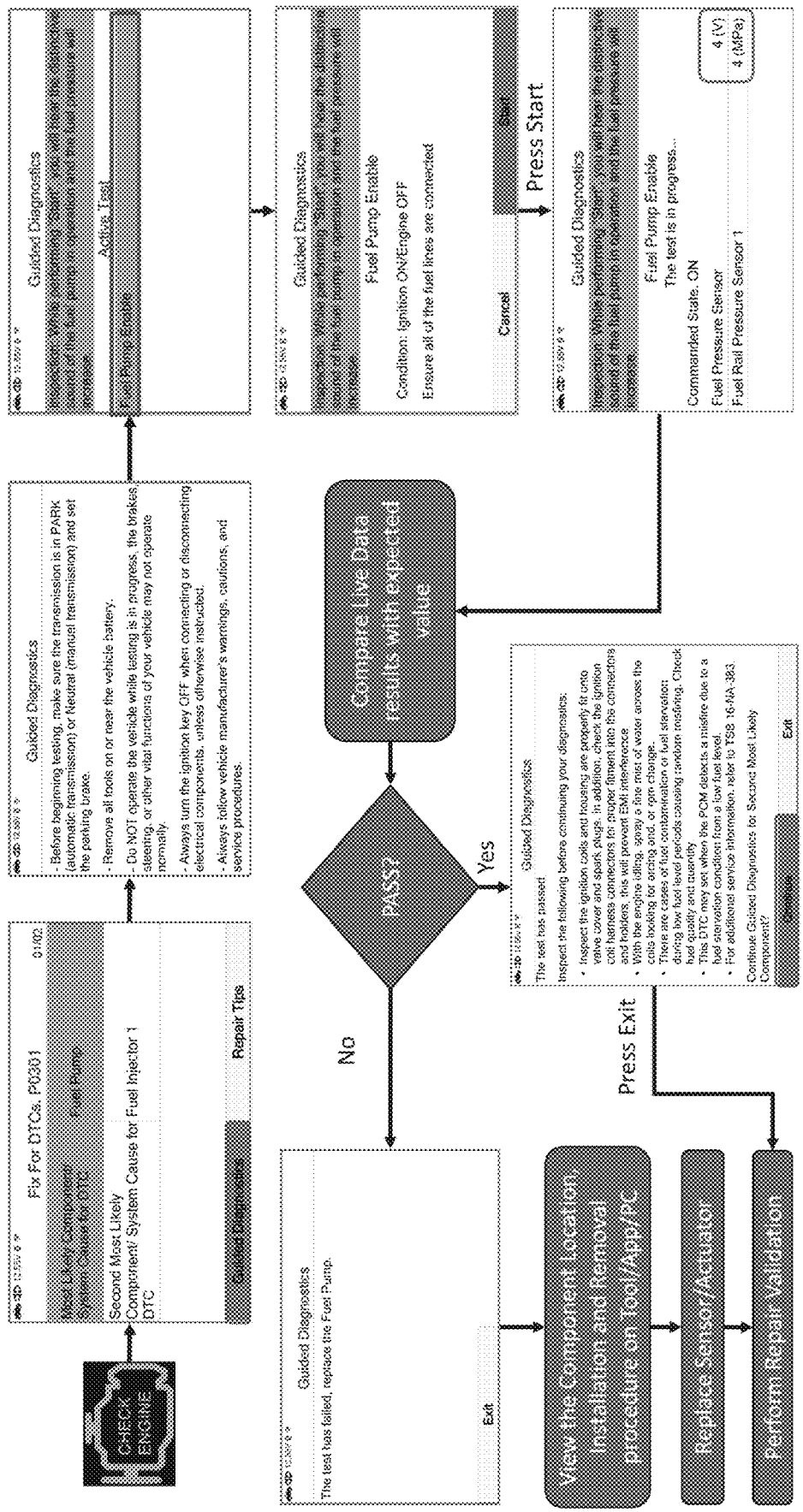
Figure 11B:
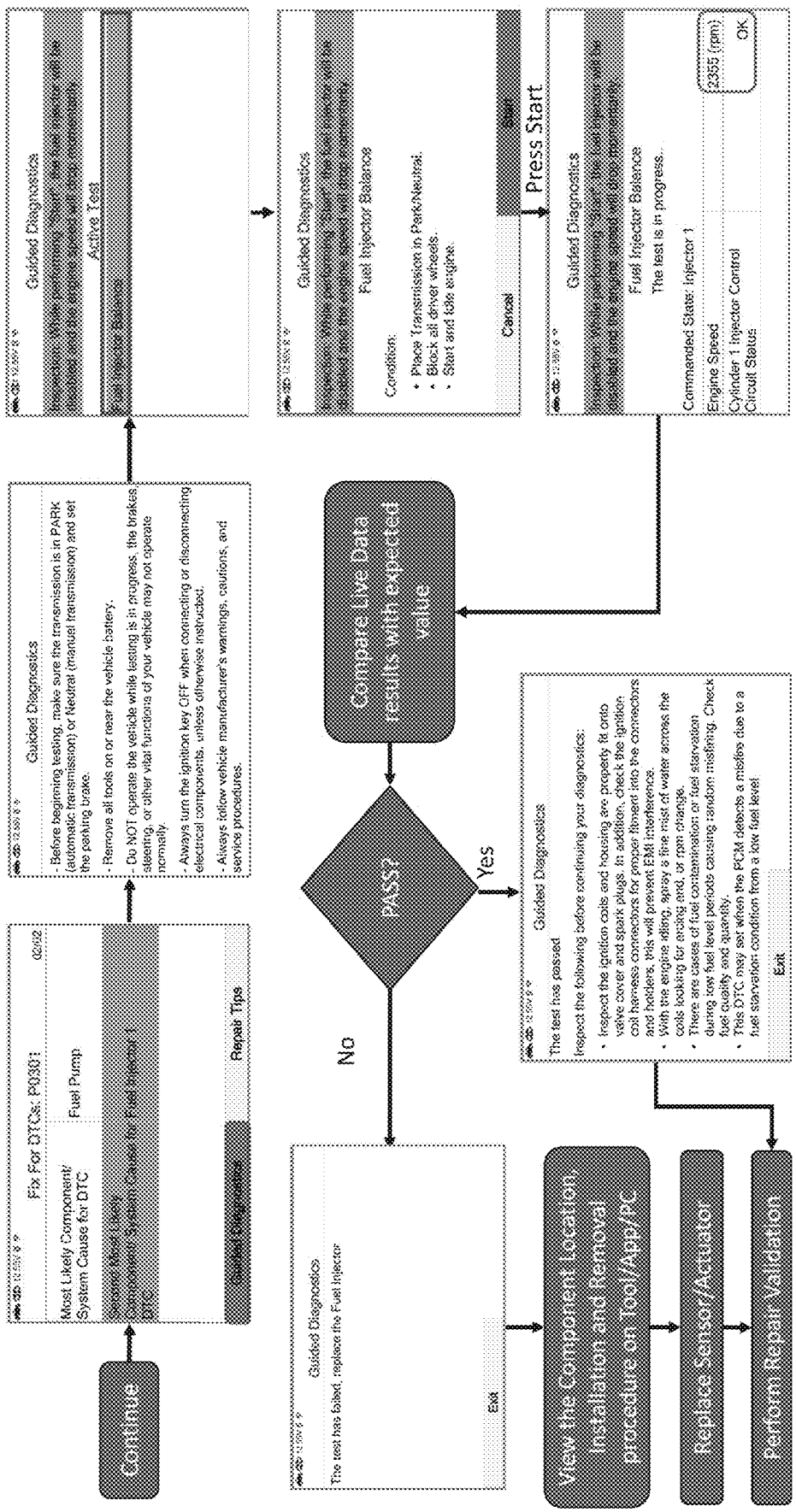

FIGS. 10-11B depict examples of the enhance user interaction system on two different vehicles.

Test Box

Figure 12:
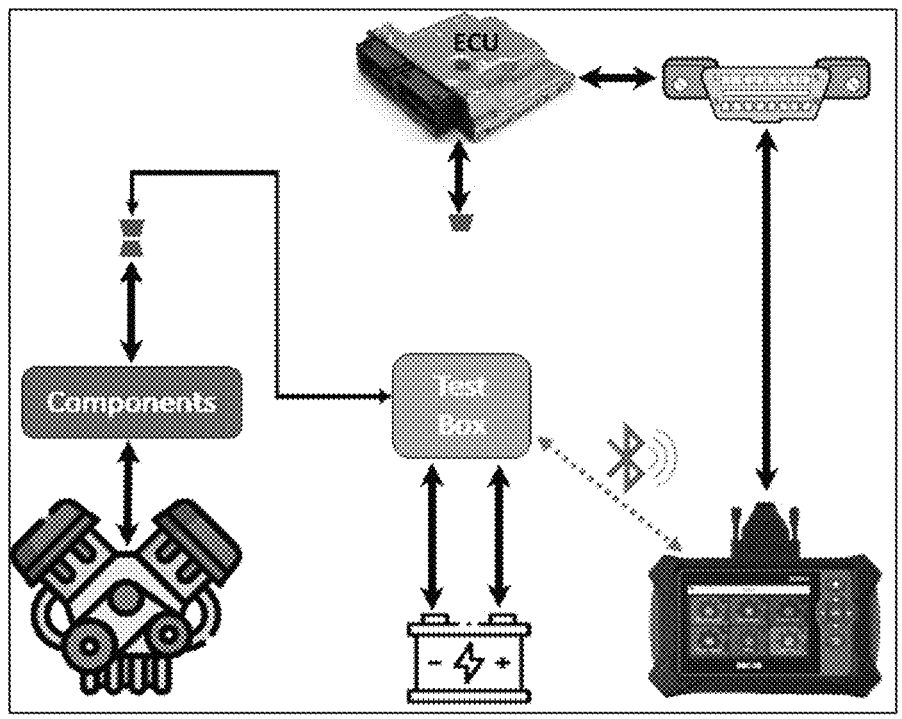
FIG. 12 is a schematic view of a diagnostic system which utilizes a test box for diagnostic purposes, the test box being communicable with vehicle components.
Figure 13:
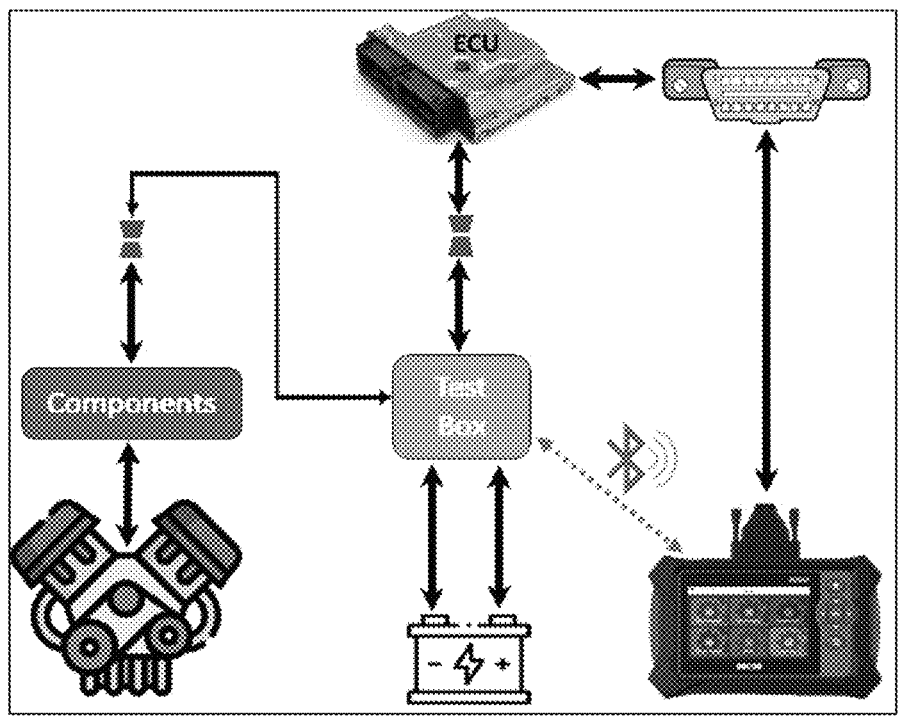
FIG. 13 is a schematic view of a diagnostic system which utilizes a test box for diagnostic purposes, the test box being communicable with vehicle components and the ECU.
Figure 14A:
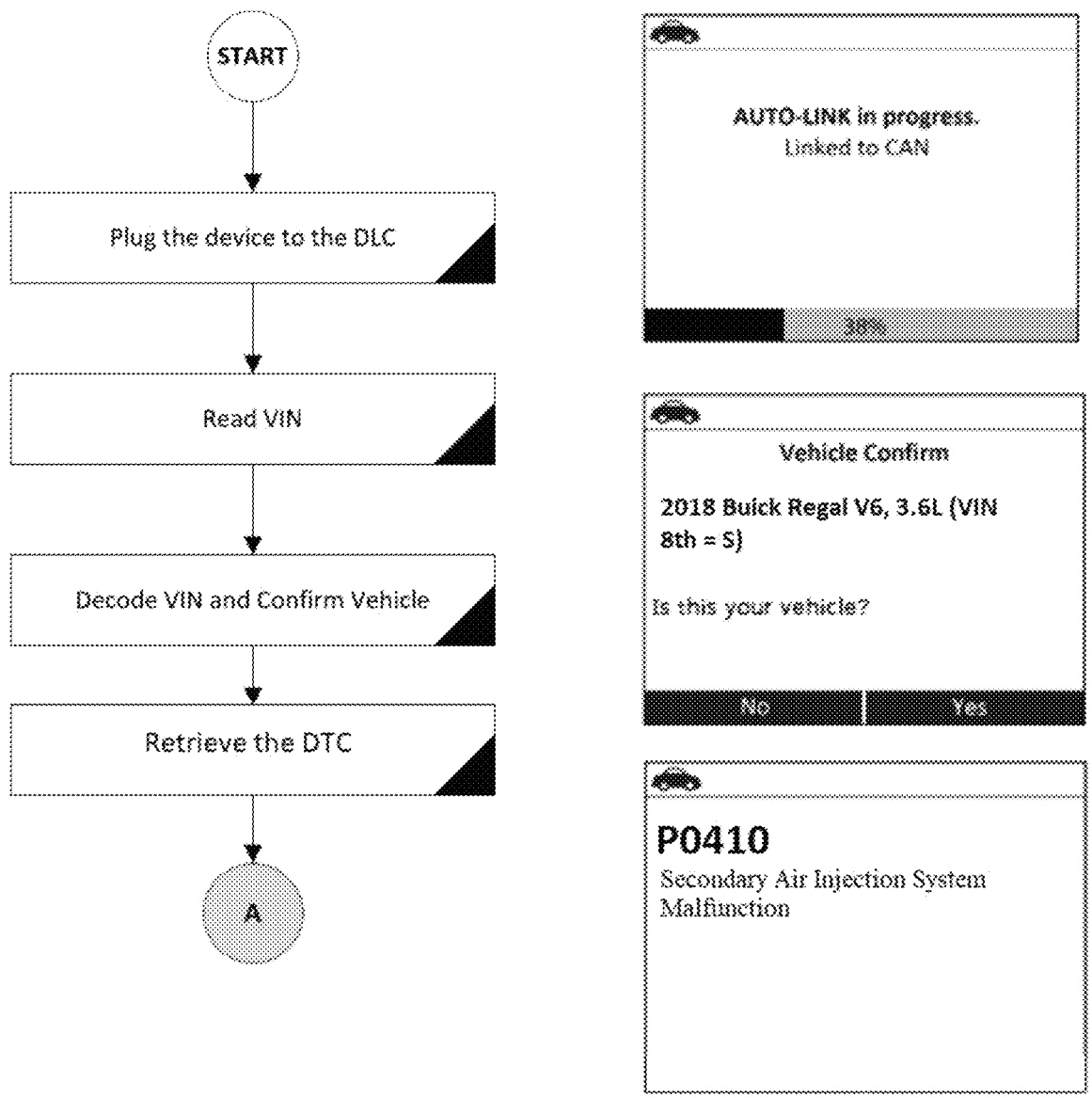
FIGS. 14A-C2 are flow charts illustrating a diagnostic methodology according to the present disclosure.
Figure 14B:
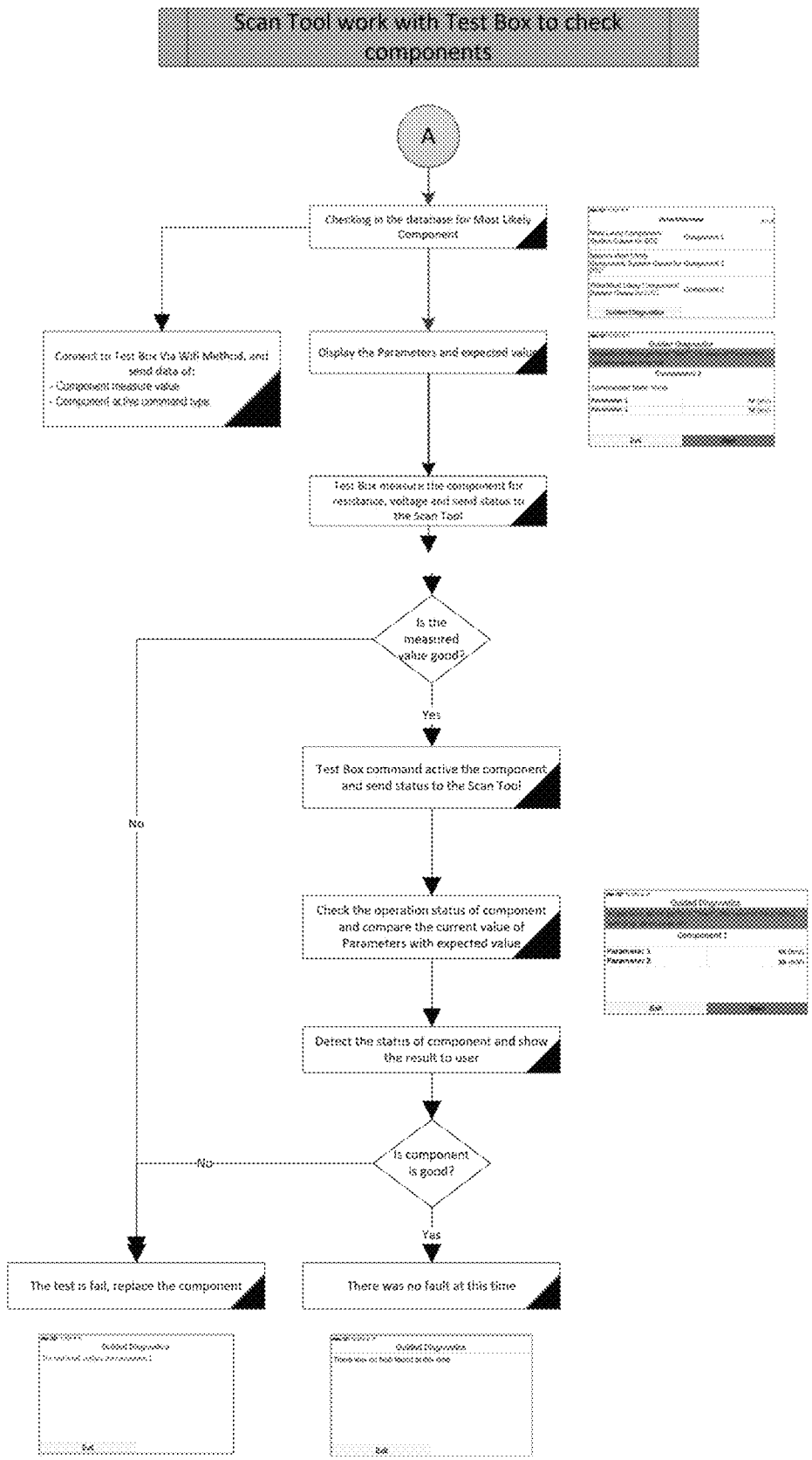

Referring now to FIGS. 12 and 13, it is also contemplated that the DAT 14 may be configured for use with a test box, which may be connectable with the vehicle to monitor signals sent between components on the vehicle, as well as to monitor data generated by components on the vehicle, to enhance the diagnostic capabilities offered by the system 10. The test box be beneficial to provide an additional data access point when conducting active tests/special function tests to ensure the expected signals are being communicated between the proper components. Furthermore, in the event a most likely fix is associated with a component that does not have an associated active test/special function test, it is contemplated that the test box may be capable of selectively activating/deactivating that component to provide more targeted diagnostics. In this respect, certain features of the test box may be utilized when the vehicle electronic control unit (ECU) does not support active tests/special function tests, while other features of the test box may be used when the ECU does support active tests/special function tests.

When the ECU does not support active tests/special function tests, the test box may be used to command vehicle components on or off. The test box may send a signal to the component and notify the DAT 14 to monitor the live data for a reaction from the component, as depicted schematically in FIG. 12.

When the ECU does support the active test/special function test, the test box may be used to confirm that the ECU sent the intended active test/special function test signal to the component, as depicted schematically in FIG. 13. That intended active test/special function test signal may be compared with an expected signal to determine whether that signal passes or fails. An alert signal may be communicated from the test box to the DAT 14, with the alert signal being indicative of whether the testing signal passed or failed.

The test box may be operatively connected to the vehicle via harness connectors, alligator clips, terminals, etc., depending on the required connection for the desired testing.

The test box can communicate with the DAT 14, either via wired communications, or wireless communications (e.g., Bluetooth, Wi-Fi, etc.). The test box may be configured to receive command signals or data signals from the DAT 14, measure operational data values for one or more vehicle components, and generate command signals for diagnostic testing. The test box may also be configured to send communications to the DAT 14, including measured/monitored vehicle data, status updates, etc.

One feature of the test box is the ability to detect signal communication between an ECU and a component operatively connected to that ECU. In this regard, many DTCs may be caused by a faulty ECU or faulty wires from the ECU to the components, and the use of the test box allows for a more targeted assessment of the signal communication between the ECU and the component(s) to identify the location of the underlying problem.

The test box may be capable of detecting a signal from the ECU to a component when the ECU sends a command signal to the component. The ECU may receive the command signal from the DAT 14, with the command signal instructing the ECU to send a signal to the targeted component to turn the targeted component on or off, or perform some other prescribed function. The test box may then monitor the communication line between the ECU and the component to determine if the expected signal is in fact generated. If the expected signal is generated and conforms with expected results, it may be an indication that the ECU and the communication line are healthy. The test box may communicate the result of that determination to the DAT 14.

The test box may measure voltage signals, resistance signals, or other signal variable associated with a particular component, and compare with a predetermined acceptable value to determine the health and operability of the component. In this regard, such voltage/resistance signals may be used as an indication of whether the component is healthy and functioning properly.

Operation of the test box may entail access of the test database to obtain testing instructions, testing parameters or other commands, data or information that may be needed during operation of the test box. In this regard, in addition to having stored information related to the special function tests/active tests, as described above, the test database 16 may additionally include commands, instructions, and/or data signals associated with use of the test box. In particular, the test database 16 may include information that may be sent to the DAT 14 which may be used to confirm whether the ECU sent the signal to the targeted component. The test database 16 may also include information used by the test box to receive command signals or data signals from the DAT 14. The test database 16 may further include instructions for measuring operational data values for one or more vehicle components, as well as commands for diagnostic testing.

Due to the potentially comprehensive functional capabilities of the test database 16 it is contemplated that the test database 16 may be separated into multiple components, and is not limited to a single database. Moreover, the test database 16 may be stored on a computer, sever, or other hardware having a test database controller, which may route certain signals to various components depending on the desired test. For instance, one test may require instructions to be routed to the test box, while expected testing parameters may be routed to the DAT 14. Thus, the data stored in the test database may also include destination information associated therewith to facilitate routing of the various data, information, and/or commands to the associated components by the test database controller.

In some instances, the use of the test box may be autonomously initiated in response to prior testing or monitoring conducted by the DAT 14. For instance, a prior special function test may produce results in which further testing by the test box may be desirable. Accordingly, the DAT 14 may be configured to autonomously initiate testing by the test box in response to prescribed conditions being monitored by the DAT 14. The initiated testing may require access of information by the testing database 16, as discussed in more detail above.

In certain embodiments, some or all of the functionalities of the test box may be implemented by the DAT 14, a smartphone or other hardware. For instance, the DAT 14, smartphone, etc. may include a connector port which may be connected to alligator clips, harness or the like which may allow for connection of the device to the vehicle. The device may also include instructions and/or data stored thereon which may be needed to implement the functionalities of the test box.

Additional Considerations

It is contemplated that certain implementations of the system 10 may be configured to provide an alert if the DAT 14 is attempting to connect to a non-compatible vehicle, such as an electric vehicle. In this regard, the DAT 14 may be configured to determine whether the vehicle is a compatible vehicle either in response to receiving an electronic VIN, or in response to receiving data used to determine the identity of the vehicle. If the vehicle is not compatible, the DAT 14 may generate an alert on the display and cease implementation of any further diagnostic functionality described herein.

It is also contemplated that various aspects of the present disclosure may integrate artificial intelligence/machine learning into the system 10 and related methodologies. In lieu of, or in addition to the above-described technique for deriving a diagnostic solution based on use of a vehicle specific historical database, machine learning may be used to recognize associations between certain vehicle data (e.g., live data, patterns of live data and static data) and/or other vehicle operational and environmental conditions (e.g., sensed vibrations, sounds, vapors, temperatures, etc.) with the diagnostic solution, which association may enable the determination of a diagnostic solution without the need to reference the historical database. The AI may further be operative to identify external resources suitable to further inform the user with respect to the diagnostic solution and establish communication with such resources via an appropriate and available communication pathway, such as a cellphone enabled pathway or a V2X pathway to V2X service providers and associated resources. That functionality may proceed autonomously in response to receipt of the vehicle data, in response to an evaluation of the urgency of the vehicle diagnostic solution, or on-demand, in response to a user input. Another exemplary application of the machine learning enabled diagnostic process would be to support and facilitate the evolution of ADAS systems, in relation to installation, testing and/or monitoring of those systems during driving conditions.

The machine learning capabilities may be utilized to streamline certain portions of the diagnostic process to arrive at a possible solution without requiring access to certain databases. For instance, one embodiment of the diagnostic methodology described herein includes the following steps: step 1—receiving a data package from the vehicle; step 2—analyzing the data package to determine the vehicle identity; step 3—identifying a most likely fix based on the diagnostic data and the vehicle identity; step 4—implementing a special function test to determine a pass fail status; step 5—identifying a diagnostic solution as the most likely fix when the special function test results in a fail. The machine learning capabilities may allow a user to proceed directly from step 1 to step 5, while bypassing steps 2, 3, and 4. In other words, the machine learning capabilities may be able to recognize a diagnostic solution (e.g., step 5) based on the data package received from the vehicle (step 1), without having to proceed through steps 2, 3, and 4. In some cases, the machine learning capabilities may allow for bypassing only a single step, or multiple intervening steps. In other cases, the machine learning capabilities may simply be an alternative to a given step due to a higher level of confidence or accuracy being associated with the machine learning alternative.

The machine learning capabilities may be integrated into the DAT 14, a remote server, or other components of the system 10 (e.g., a smartphone).

The system 10 may include a machine learning controller configured to implement the capabilities of the machine learning module based on an assessment of the data packet. The machine learning capabilities may be implemented autonomously in response to a triggering event, or alternatively, in response to an input provided by the user. For instance, autonomous implementation may be implemented in response to the DAT 14 being plugged into a diagnostic port on the vehicle 12, or in response to the data packet received from the vehicle having certain characteristics, such as certain DTCs or live data characteristics known by the machine learning controller as being suitable for machine learning diagnostics. The autonomous implementation may also be implemented in response to a dead-end being reached using non-machine learning alternatives. For instance, if non-machine learning diagnostics requires communication with a remote resource which may be inaccessible, the machine-learning functionalities may be implemented autonomously by the system 10.

The machine learning module may be continuously updated with historical information to allow for diagnostic learning. In this regard, the machine learning module may be configured to remain continuously ready to evolve in its learning, while also being ready for use as a diagnostic resource. The machine learning module may be used as a resource to identify a likely fix, identify a special function test, and/or to bypass the diagnostic process and go straight to a diagnostic solution. Any output (e.g., likely fix, special function test, diagnostic solution) may be referred to herein as a machine learning output.

Determination of the machine learning module output may be based on diagnostic data and may be effectuated by mapping the diagnostic data to the machine learning output. For example, a set of possible fixes indexed by diagnostic data (e.g., in the form of a lookup table or decision tree) may be stored locally on the DAT 14 or stored remotely and accessed by the DAT 14 or a related electronic device (e.g., smartphone). By using the diagnostic data as an index, the machine learning module may select one or more fixes. Moreover, instead of, or in addition to, using the diagnostic data in a conventional manner for purposes of identifying a most likely fix, the diagnostic data may be input to a machine learning module. In one instance, the output of the machine learning module may be the most likely fix. In another instance, the output of the machine learning module may be identification of a special function test. In yet another instance, the output of the machine learning module may be identification of a diagnostic conclusion. The machine learning module may be trained over time on sets of diagnostic data to generate a relevant output.

The machine learning module may be used as a supplement or alternative to the diagnostic systems and methodologies described herein. For instance, the machine learning module may recognize vehicle data that is very similar, if not identical, to vehicle data received from another vehicle during an earlier test which was conducted using the systems and methodologies described herein. The vehicle data may be analyzed by the machine learning module, which may recognize the data as having already been analyzed, and generate an output that is a diagnostic solution having been previously identified during the prior testing of the similar vehicle. For instance, the vehicle data received from the vehicle may include DTC and freeze frame data that may be used as an input into the machine learning module, along with vehicle identity data (e.g., electronic VIN or other data described herein), which may be used by the machine learning module to identify a most likely fix without running a special function test, even though the DTC data may be associated with a component suitable for special function testing. However, the learning capabilities of the machine learning module may be sufficient to identify a most likely fix without having to conduct the special function test. In this regard, the machine learning capabilities may allow for identification of a diagnostic solution independent of conducting a special function test and/or monitoring live data. In this regard, the machine learning capabilities may be analogous to a learned-bypass functionality.

It is contemplated that any output of the machine learning module may be associated with a confidence score, which may include a quantifiable number between 0-100, with 100 being associated with certainty, and 0 being associated with no confidence. The confidence score may be impacted by the correlation of the data package received from the vehicle under test to the historical vehicle data used during the machine learning process. Furthermore, the confidence score may start low for new vehicles, and may increase over time as those newer vehicles age and the ability to learn the diagnostic tendencies of those vehicles increases. The system may utilize the confidence score as a guide to determine whether to bypass any alternative diagnostic steps in favor of an output generated by the machine learning module. For instance, the machine learning module may suggest a certain special function test based on diagnostic data and vehicle identification data received with the vehicle. However, the suggested special function test may be associated with a confidence score that is below a prescribed magnitude, and thus, the system 10 may disregard the suggested special function test, and proceed with the alternative methodologies in determining a special function test (e.g., accessing the diagnostic database to determine a most likely fix, and accessing the test database to determine the special function test).

Having machine learning capabilities accessible locally, either on the DAT 14 or a local device communicable with the DAT 14 (e.g., a smartphone) may also be useful when a vehicle breaks down in a remote location and communication with remote diagnostic resources, such as the test database 16, DTC database 18 and vehicle identification database 20, is not available. The DAT 14 may be used to retrieve any available data and information from the vehicle 12 and use that information as an input to the machine learning module. The machine learning module may then analyze the data, and based on the learning previously completed by the machine learning module, identify a most likely fix. This may be based solely on an analysis of the diagnostic data, without any confirmatory testing, or alternatively, if special function testing is available, the most likely fix may be used to identify a special function test, which may be run, as described in more detail above.

It is also contemplated that the machine learning module may be used to detect and decipher verbal signals communicated from a user as part of the diagnostic process. The verbal signals may be analyzed by a natural language processing (NLP) model to derive diagnostic information. For instance, the user may communicate certain vehicle identification information and symptomatic information to use as inputs in identifying a most likely fix, which then may be used to identify a special function test. The verbal commands, may include vehicle year, make, model and engine, and may describe the vehicle's mileage, and any symptoms the user is noticing, such as lights/alarms/alerts being generated by the vehicle, as well as uncommon sights, smells, sounds, vibrations, etc. The machine learning module may be configured to use that information as an input to identify a most likely fix. The verbal commands may also be used to derive appropriate DAT feature functions to efficiently address the situation, without the user needing to know how to operate the DAT 14. The verbal commands may also be used to implement functionality on the test box, either in conjunction with the DAT 14, or independently.

It is further envisioned that the user's smartphone or other handheld electronic device may be used to gather data and information that may be used as an input to the diagnostic process. For instance, a smartphone may be used to detect vibrations in the vehicle, as well as vehicle speed and vehicle acceleration. Sensors may also be attached to the smartphone to enhance the data retrieval capabilities of the smartphone. For instance, the smartphone may be connected to a smell sensor that may be capable of sampling air to aid in the diagnostic process. The smell sensor may be capable of smelling smoke or odors (e.g., burning oil, burning brakes, etc.) to aid in the diagnostic process. In one implementation, the data gathered by the smartphone may be used as yet another factor, in combination with the DTCs, freeze frame data, etc., in determining the most likely fix and/or the special function test. In other implementation, the gathered data may be used by the machine learning module as a factor in determining the most likely fix and/or the special function test.

For more information regarding the use of machine learning and natural language processing models in the context of automotive diagnostics, please refer to U.S. patent application Ser. No. 18/328,451, for VEHICLE DIAGNOSTICS WITH INTELLIGENT COMMUNICATION INTERFACE, filed on Jun. 2, 2023, and owned by Innova Electronics Corporation, the substance of which is expressly incorporated herein by reference.

FURTHER EXAMPLES 1.1 Scan Tool without Test Box

The vehicle: 2014 Chevrolet Suburban V8, 5.3 L (VIN 8th=S).

The MIL DTC retrieved from the vehicle: P0410.

Based on the database, the Most likely Fix for this Vehicle and DTC is: Secondary Air Injection Pump Relay.

The Parameter Items that need to be monitored and specification when perform activating the Secondary Air Injection Pump Relay is as below:

| Parameter Items | Specification value |
| --- | --- |
| Heated Oxygen Sensor 1 (HO2S 1) | 0-5 mV |
| Heated Oxygen Sensor 2 (HO2S 2) | 0-5 mV |

Figure 15:
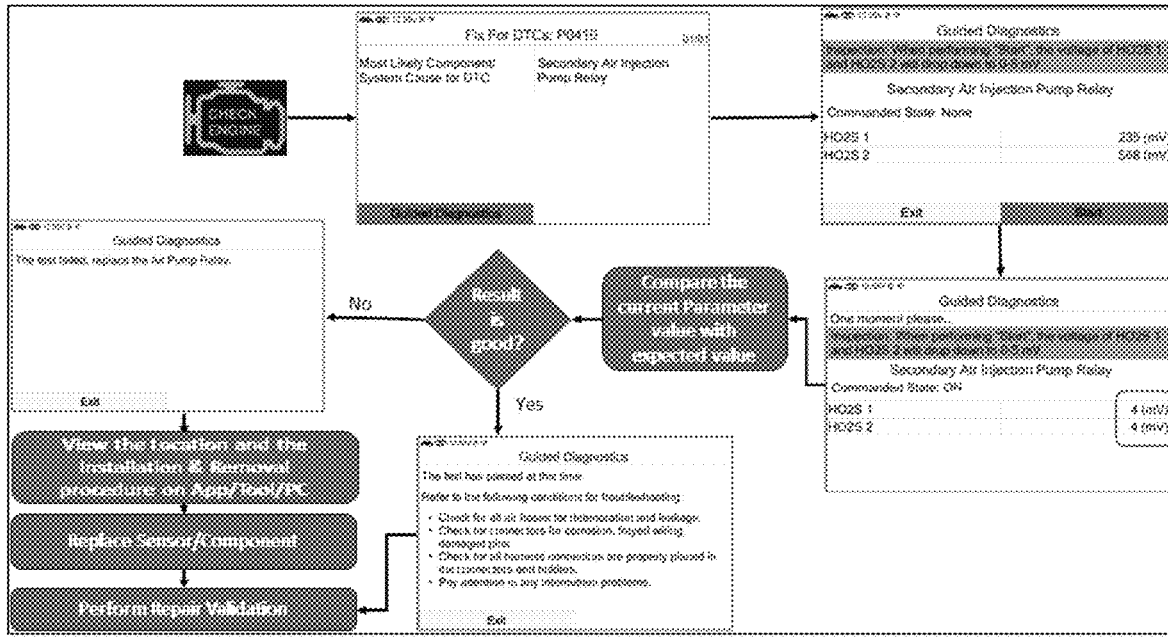
FIG. 15 depicts sequential screenshots on a DAT during a first use-case example.

The flow on the DAT will be as shown in FIG. 15.

When activating the Secondary Air Injection Pump Relay, the DAT will monitor the value of Parameter Items: Heated Oxygen Sensor 1 (HO2S 1), Heated Oxygen Sensor 2 (HO2S 2) and compare with the specification value to show the result.

1.2 Scan Tool Work with Test Box to Check Components

The vehicle: 2014 Chevrolet Suburban V8, 5.3 L (VIN 8th=S).

The MIL DTC retrieved from the vehicle: P0410.

Based on the database, the Most likely Fix for this Vehicle and DTC is: Secondary Air Injection Pump Relay.

The Parameter Items that need to be monitored and specification when performing activation of the Secondary Air Injection Pump Relay is as below:

| Parameter Items | Specification value |
| --- | --- |
| Heated Oxygen Sensor 1 (HO2S 1) | 0-5 mV |
| Heated Oxygen Sensor 2 (HO2S 2) | 0-5 mV |

Figure 16:
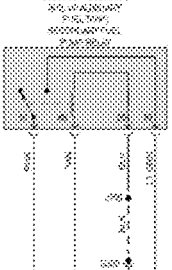
FIG. 16 is a chart depicting details of a secondary air injection pump relay that the DAT sends to a test box during a second use-case example.

The specification of the Secondary Air Injection Pump Relay that the DAT 14 sends to the Test Box is as depicted in FIG. 16.

The flow on the DAT 14 will be as depicted in FIG. 17.

When performing the function, the DAT 14 will connect to the Test Box and send the data of signal type of active command from the ECU, component measure value, component active command type. Next, the Test Box will activate the Secondary Air Injection Pump Relay, the DAT 14 will monitor the value of Parameter Items: Heated Oxygen Sensor 1 (HO2S 1), Heated Oxygen Sensor 2 (HO2S 2) and compare with the specification value to show the result.

If the result is fail, the Test Box is used to measure the component base on the data from the DAT and send the result to the DAT.

1.3 Scan Tool Work with Test Box to Check Signal of ECU and Check Component

The vehicle: 2016 Hyundai Tucson L4, 2.0 L.

The MIL DTC retrieved from the vehicle: P0078.

Based on the database, the Most likely Fix for this Vehicle and DTC is: Intake Oil Control Valve.

The Parameter Items that need to be monitored and specification when perform activating the Intake Oil Control Valve is as below:

| Parameter Items | Specification value |
| --- | --- |
| Engine Speed | Decrease 200 RPM when command ON |
| Intake Camshaft Bank 1 Actual Position | |
| Intake Camshaft Bank 1 Desired Position | Change +− 20% between command ON/OFF |

The specification of the Intake Oil Control Valve that the DAT 14 send to the Test Box is as depicted in FIG. 18.

Figure 19:
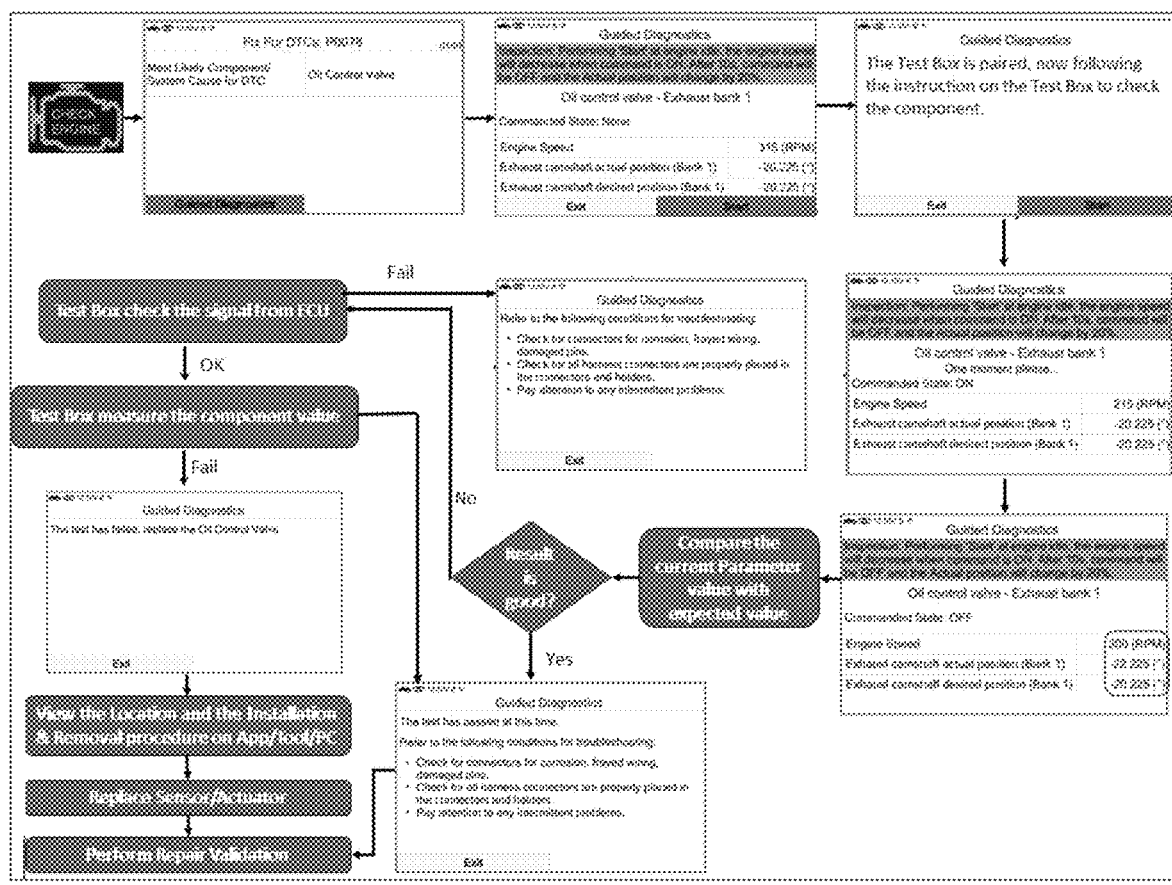
FIG. 19 depicts sequential screenshots on a DAT during the third use-case example.

The flow on the DAT 14 will be as depicted in FIG. 19.

When performing the function, the DAT 14 will connect to the Test Box and send the data of signal type of active command from the ECU, component measure value, component active command type.

Then the DAT 14 actives the Intake Oil Control Valve, the DAT 14 will monitor the value of Parameter Items: Engine Speed, Intake Camshaft Bank 1 Actual Position, Intake Camshaft Bank 1 Desired Position and compare with the specification values to show the result.

If the result is fail, the Test Box is used to check the of signal of active command from the ECU and measure the component base on the data from the DAT 14 and send the result to the DAT 14.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A vehicle diagnostic method comprising the steps of:
   retrieving vehicle data from a vehicle, the vehicle data at least including diagnostic data;
   analyzing the retrieved vehicle data to determine if the vehicle data includes an electronic vehicle identification number (VIN);
   when the vehicle data does not include the electronic VIN, assessing the retrieved vehicle data to determine an identity of the vehicle;
   determining a most likely fix based on a combined assessment of the diagnostic data and the electronic VIN or the assessment of the diagnostic data;
   determining whether the vehicle can execute a special function test based on the determined most likely fix and the determined identity of the vehicle;
   when a special function test can be executed:
      generating a signal to run the special function test; and
      determining a pass or fail status based on the special function test; and
   when a special function test cannot be executed:
      generating a command to implement a desired functionality on a desired component associated with the determined most likely fix;
      monitoring live data from the desired component; and
      determining a pass or fail status based on the monitored live data wherein the steps of:
         determining the most likely fix to determining a pass or fail status based on the special function test proceed autonomously in response to determining the identity of the vehicle when the special function test can be executed; and
         determining the most likely fix to determining a pass or fail status based on the monitored live data proceed autonomously in response to determining the identity of the vehicle when the special function test cannot be executed.

2. The vehicle diagnostic method recited in claim 1, wherein the diagnostic data includes a diagnostic trouble code.

3. The vehicle diagnostic method recited in claim 1, further comprising the step of displaying a safety screen prior to generating the signal to run the special function test.

4. The vehicle diagnostic method recited in claim 1, when the special function test can be executed, the method further comprising the step of sending a command signal from a data acquisition and transfer device to a test box to initiate testing by the test box on a targeted component on the vehicle, the test box being configured to be operatively connectable to the target component and monitor a vehicle communication associated with the targeted component, and/or send an actuation/deactivation signal to the targeted component, the targeted component being associated with the monitored live data.

5. The vehicle diagnostic method recited in claim 4, wherein the targeted component is associated with the determined most likely fix.

6. The vehicle diagnostic method recited in claim 1, where the retrieved vehicle data includes OBD data.

7. The vehicle diagnostic method recited in claim 1, wherein the retrieved vehicle data includes live data.

8. The vehicle diagnostic method recited in claim 1, further comprising the step of monitoring live data generated during the special function test.

9. The vehicle diagnostic method recited in claim 1, further comprising the step of receiving a verbal command from a user and implementing the retrieving step in response to receipt of the verbal command.

10. The vehicle diagnostic method recited in claim 1, further comprising the steps of:
    receiving a verbal command from a user;
    analyzing the verbal command by a natural language processing model to identify a diagnostic output; and
    using the diagnostic output to identify the special function test so as to bypass the retrieving step, the analyzing step, the determining of the most likely fix step, and the determining the special function test based on the most likely fix step.

11. The vehicle diagnostic method recited in claim 1, wherein the steps of analyzing the retrieved vehicle data to determining the pass or fail status proceeds autonomously in response to retrieval of the data packet from the vehicle.

12. The vehicle diagnostic method recited in claim 1, wherein the vehicle data is retrieved by a data acquisition and transfer device (DAT).

13. The vehicle diagnostic method recited in claim 1, wherein the step of determining the most likely fix is implemented by a machine learning module having been trained based on historical vehicle data.

14. A vehicle diagnostic method comprising the steps of:
    retrieving vehicle data from a vehicle, the vehicle data at least including diagnostic data;
    analyzing the retrieved vehicle data to determine if the vehicle data includes an electronic vehicle identification number (VIN);
    when the vehicle data does not include the electronic VIN, assessing the retrieved vehicle data to determine an identity of the vehicle;
    determining whether the vehicle can execute a special function test based on a combined assessment of the diagnostic data and the electronic VIN or the assessment of the diagnostic data;
    when a special function test can be executed:
        communicating information to enable implementation of the special function test;
        monitoring live data generated during the special function test; and
        determining a pass or fail status based on a comparison of the monitored live data to expected live data; and
    when a special function test cannot be executed:
        generating a command to implement a desired functionality on a desired component associated with the determined most likely fix;
        monitoring live data from the desired component; and
        determining a pass or fail status based on the monitored live data;
    wherein the steps of:
        analyzing the retrieved vehicle data to determining a pass or fail status based on the comparison of the monitored live data to expected live data proceed autonomously in response to retrieving vehicle data when the special function test can be executed; and
        analyzing the retrieved vehicle data to determining a pass or fail status based on the monitored live data proceed autonomously in response to retrieving vehicle data when the special function test cannot be executed.

15. A vehicle diagnostic method comprising the steps of:
    retrieving vehicle data from a vehicle, the vehicle data at least including diagnostic data;
    analyzing the retrieved vehicle data to determine if the vehicle data includes an electronic vehicle identification number (VIN);
    when the vehicle data does not include the electronic VIN, assessing the retrieved vehicle data to determine an identity of the vehicle;
    determining a most likely fix based on a combined assessment of the diagnostic data and the electronic VIN or the assessment of the diagnostic data;
    determining whether the vehicle can execute a special function test based on the determined most likely fix and the determined identity of the vehicle;
    when a special function test can be executed:
        generating a signal to run the special function test; and
        determining a pass or fail status based on the special function test; and
    when a special function test cannot be executed:
        generating a command to implement a desired functionality on a desired component associated with the determined most likely fix;
        monitoring live data from the desired component; and
        determining a pass or fail status based on the monitored live data;
    wherein the steps of:
        analyzing the retrieved vehicle data to determining a pass or fail status based on the special function test proceed autonomously in response to retrieving vehicle data when the special function test can be executed; and
        analyzing the retrieved vehicle data to determining a pass or fail status based on the monitored live data proceed autonomously in response to retrieving vehicle data when the special function test cannot be executed.

16. A vehicle diagnostic method comprising the steps of:
    retrieving vehicle data from a vehicle, the vehicle data at least including diagnostic data;
    analyzing the retrieved vehicle data to determine if the vehicle data includes an electronic vehicle identification number (VIN);
    when the vehicle data does not include the electronic VIN, assessing the retrieved vehicle data to determine an identity of the vehicle;
    determining a most likely fix based on a combined assessment of the diagnostic data and the electronic VIN or the assessment of the diagnostic data;

determining whether the vehicle can execute a special function test based on the determined most likely fix and the determined identity of the vehicle;

when a special function test can be executed:
- generating a signal to run the special function test; and
- determining a pass or fail status based on the special function test; and when a special function test cannot be executed:
- generating a command to implement a desired functionality on a desired component associated with the determined most likely fix;
- monitoring live data from the desired component; and
- determining a pass or fail status based on the monitored live data;

deriving a reliability index associated with the most likely fix; and in response to the reliability index being below a threshold, generating the signal to run the special function test, the special function test being configured to generate additional diagnostic data that supports or refutes the determined diagnostic condition.

17. The vehicle diagnostic method recited in claim 16, when the special function test can be executed, the method further comprising the step of sending a command signal from a data acquisition and transfer device to a test box to initiate testing by the test box on a targeted component on the vehicle, the test box being configured to be operatively connectable to the target component and monitor a vehicle communication associated with the targeted component, and/or send an actuation/deactivation signal to the targeted component, the targeted component being associated with the monitored live data.

18. The vehicle diagnostic method recited in claim 17, wherein the targeted component is associated with the determined most likely fix.

19. The vehicle diagnostic method recited in claim 16, further comprising the step of monitoring live data generated during the special function test.

20. The vehicle diagnostic method recited in claim 16, wherein the steps of analyzing the retrieved vehicle data to determining the pass or fail status proceeds autonomously in response to retrieval of the data packet from the vehicle.

* * * * *